(12) United States Patent
DeMonte et al.

(10) Patent No.: US 9,884,540 B1
(45) Date of Patent: Feb. 6, 2018

(54) ROLLING TARP ENCLOSURE SYSTEM

(71) Applicants: Walter Peter DeMonte, Windsor (CA); Timothy Paul DeMonte, Toronto (CA); Sheri Lyn LeBlanc, Windsor (CA)

(72) Inventors: Walter Peter DeMonte, Windsor (CA); Timothy Paul DeMonte, Toronto (CA); Sheri Lyn LeBlanc, Windsor (CA)

( * ) Notice: Subject to any disclaimer, the term of this patent is extended or adjusted under 35 U.S.C. 154(b) by 0 days.

(21) Appl. No.: 15/370,135

(22) Filed: Dec. 6, 2016

(51) Int. Cl.
*B60J 7/02* (2006.01)
*B60J 7/06* (2006.01)

(52) U.S. Cl.
CPC .................... *B60J 7/06* (2013.01); *B60J 7/022* (2013.01)

(58) Field of Classification Search
CPC ..... B60J 7/06; B60J 7/062; B60J 7/064; B60J 7/065; B60J 7/022; B60J 7/104; B60J 7/185; B60J 7/1855; B60J 10/90; B60P 7/02
USPC .................................................. 296/100.12
See application file for complete search history.

(56) References Cited

U.S. PATENT DOCUMENTS

| | | | | |
|---|---|---|---|---|
| 4,902,064 A * | 2/1990 | Tuerk | ....................... | B60J 7/062 296/100.12 |
| 5,338,084 A * | 8/1994 | Wardell | ................... | B60J 7/062 296/100.12 |
| 5,377,712 A * | 1/1995 | Lung-Sheng | ............ | B60J 7/062 135/129 |
| 5,924,759 A | 7/1999 | DeMonte et al. | | |
| 6,065,796 A * | 5/2000 | Verduyn | ................ | B60P 7/0815 296/100.01 |
| 6,976,433 B1 * | 12/2005 | Neumann | ............ | B61D 39/002 105/377.03 |
| 7,798,553 B2 | 9/2010 | Beshiri et al. | | |
| 7,854,465 B2 | 12/2010 | LeBlanc et al. | | |
| 7,931,326 B2 * | 4/2011 | Beshiri | ..................... | B60J 7/102 296/100.17 |
| 8,047,600 B2 | 11/2011 | LeBlanc et al. | | |
| 9,579,959 B2 * | 2/2017 | Beshiri | .................... | B60J 7/064 |

(Continued)

FOREIGN PATENT DOCUMENTS

| | | | | |
|---|---|---|---|---|
| BE | 1005065 A5 * | 4/1993 | ............. | B60J 7/062 |
| CA | 2636445 A1 * | 12/2009 | ............. | B60J 7/062 |

(Continued)

*Primary Examiner* — Glenn Dayoan
*Assistant Examiner* — Paul Chenevert
(74) *Attorney, Agent, or Firm* — Carrier Blackman & Associates, P.C.; Joseph P. Carrier; William D. Blackman

(57) ABSTRACT

A support rail for a movable, flatbed trailer-mounted tarp enclosure system having a tarp cover, a plurality of substantially U-shaped bows connected to and supporting the tarp cover, and rolling carriages connected to lower ends of said bows and which roll along the support rail, the support rail including a first elongate rail section which is fixed to the trailer and extends substantially parallel to a cargo support surface of the trailer, a second elongate rail section which is movably connected to the trailer, and a support mechanism which connects the second elongate rail section to the trailer such that the second elongate rail section may be moved between a first position extending continuously to the first elongate rail section along a common axis and a second position parallel to but at a different level from the first elongate rail section.

8 Claims, 28 Drawing Sheets

(56) References Cited

U.S. PATENT DOCUMENTS

2008/0197664 A1* 8/2008 Lowry .................... B60J 7/062
                                                              296/100.18
2017/0136858 A1* 5/2017 Beshiri .................. B60J 7/064

FOREIGN PATENT DOCUMENTS

| DE | 1505367 A1 | * | 10/1969 | ............. B60J 7/062 |
|----|------------|---|---------|--------------------------|
| DE | 2350974 A1 | * | 4/1975  | ............. B60J 7/062 |
| DE | 9404447 U1 | * | 5/1994  | ............. B60J 7/062 |
| EP | 2371597 A1 | * | 3/2010  | ............... B60J 7/06 |
| FR | 1372826 A  | * | 9/1964  | ............. B60J 7/062 |
| FR | 1440530 A  | * | 5/1966  | ............. B60J 7/062 |
| GB | 1048406 A  | * | 11/1966 | ............. B60J 7/062 |
| GB | 2199549 A  | * | 7/1988  | ............. B60J 7/062 |
| JP | 05050859 A | * | 3/1993  |                          |

\* cited by examiner

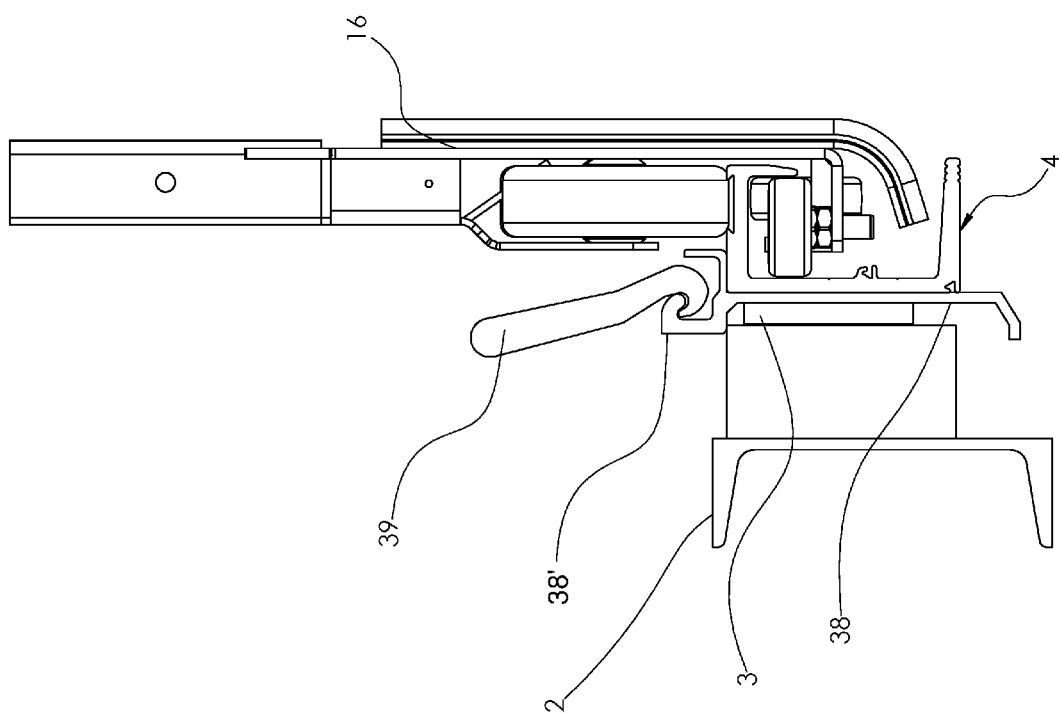

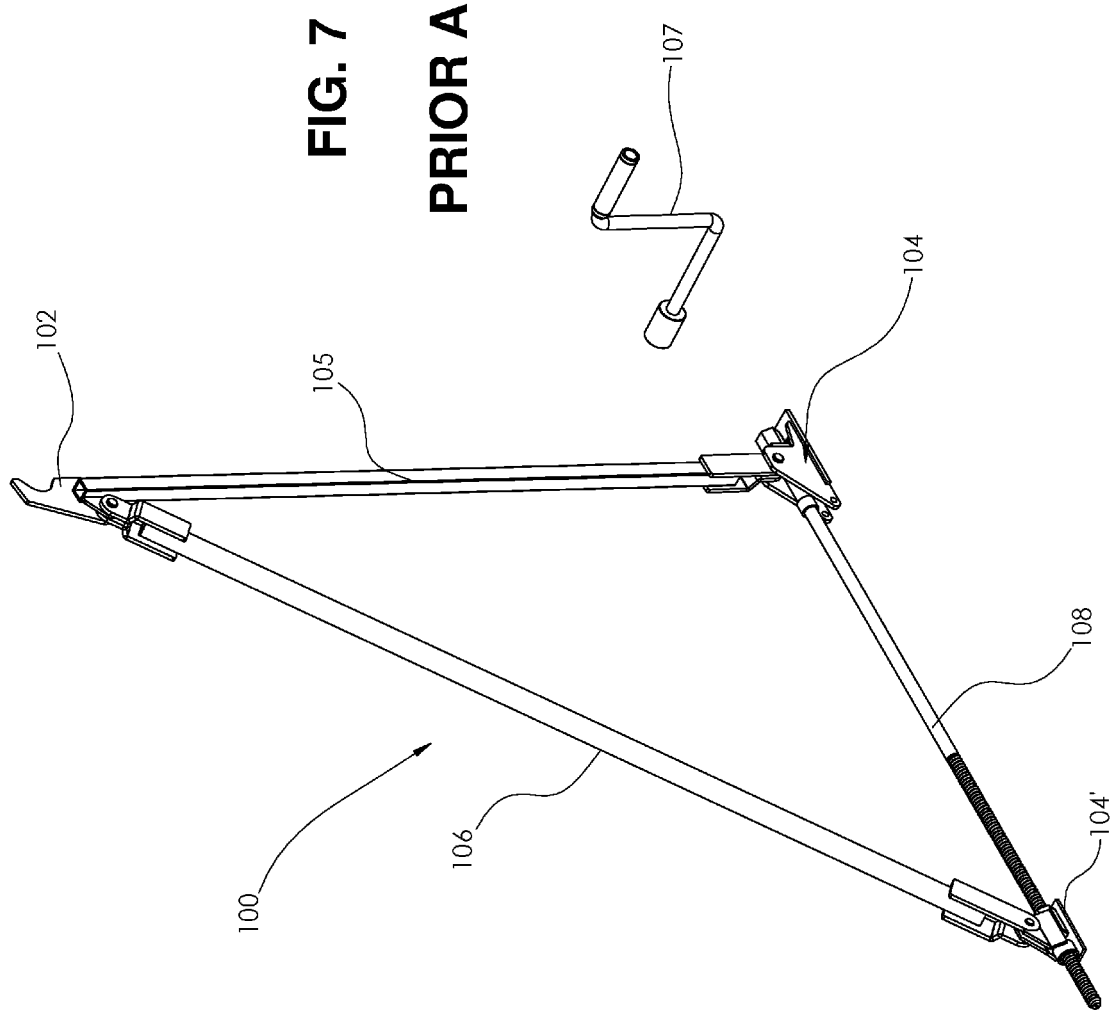

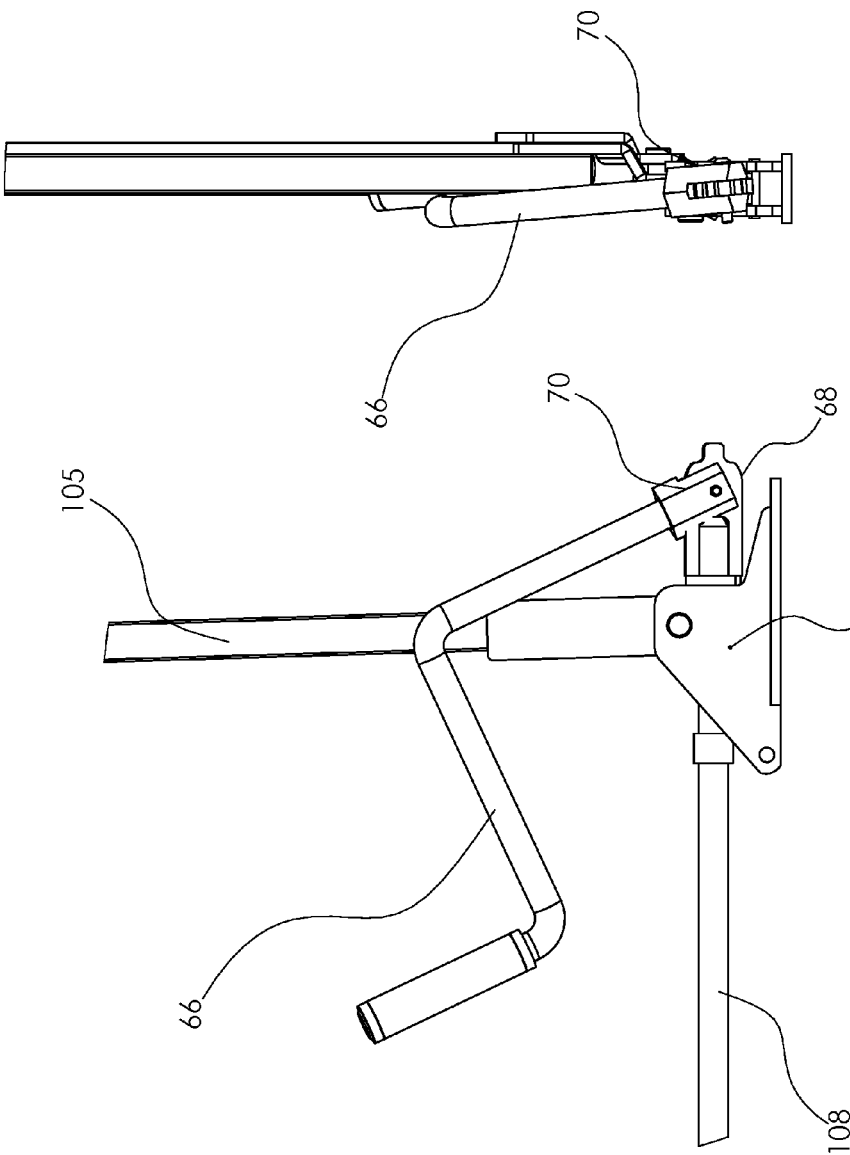

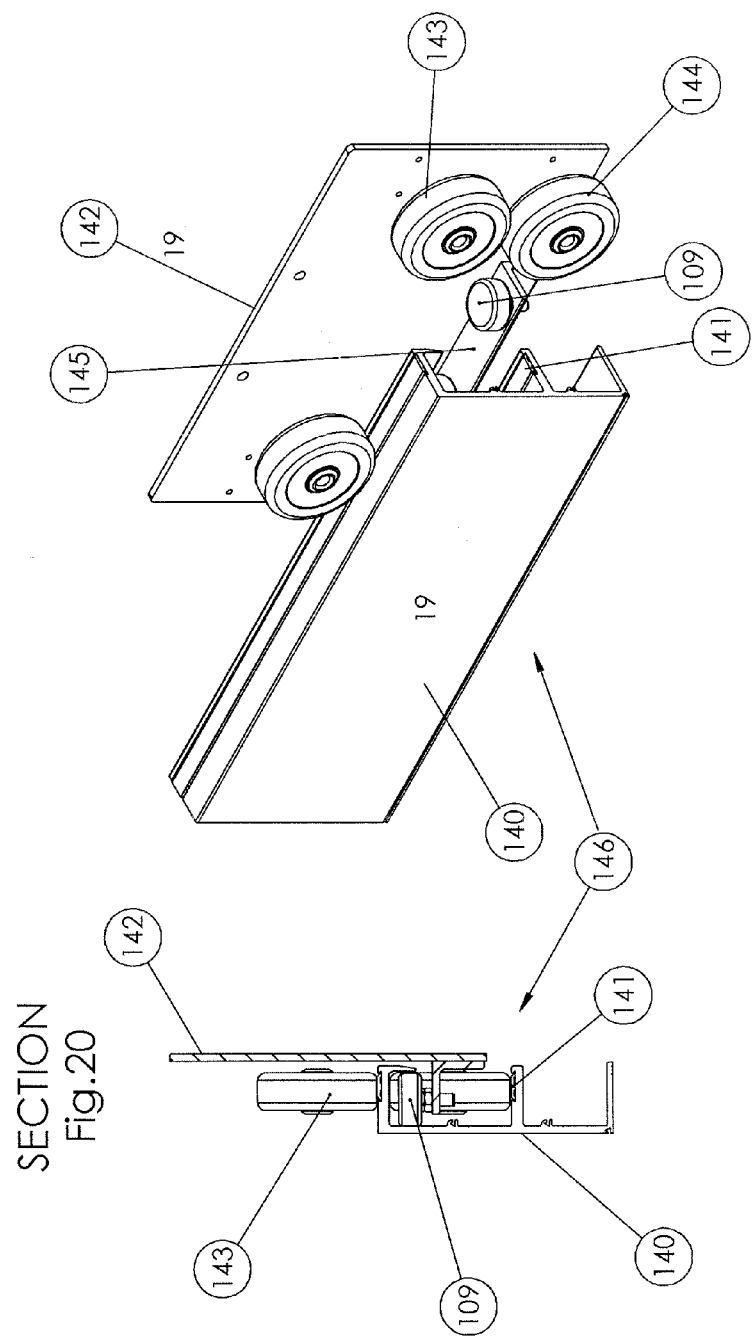

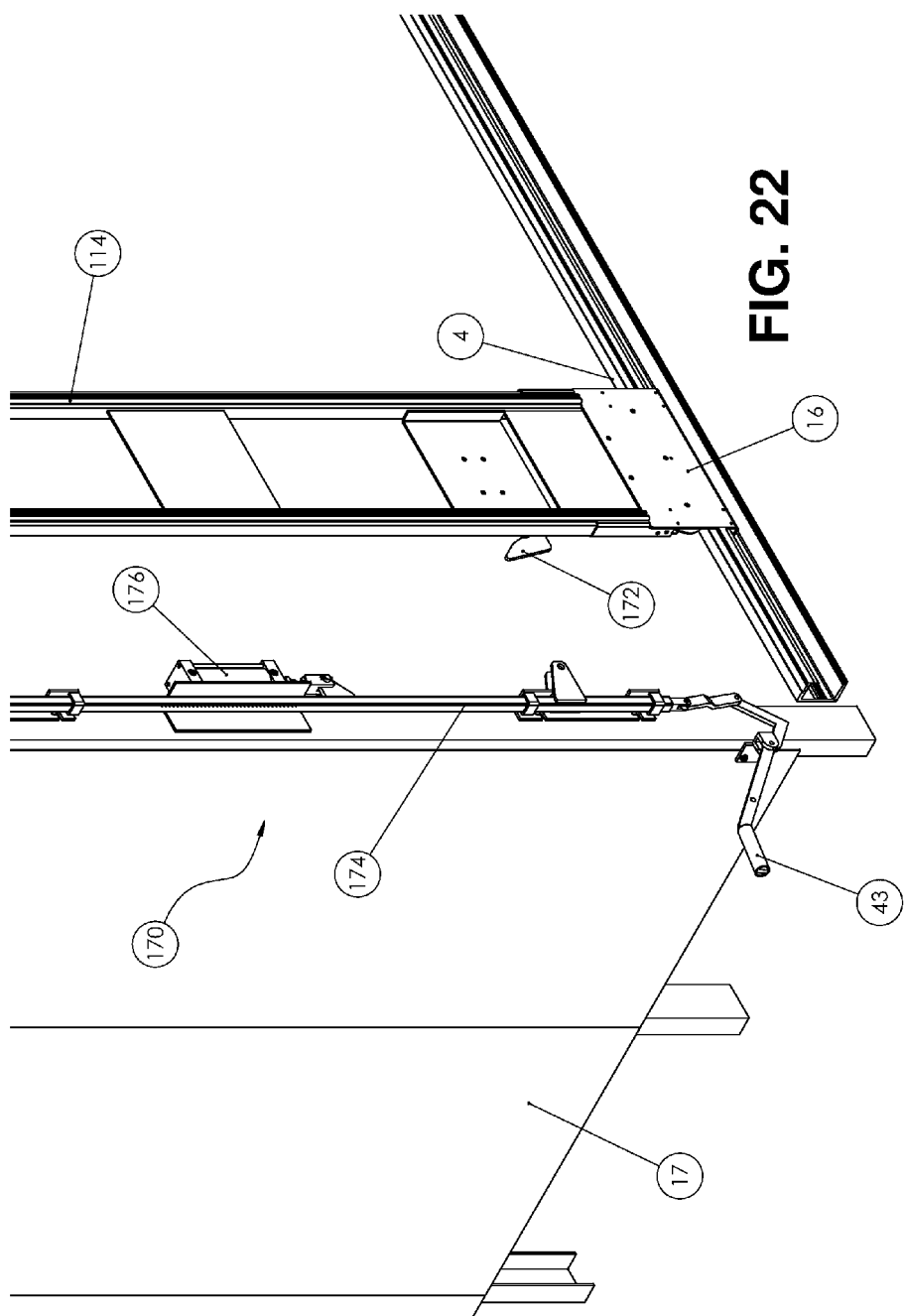

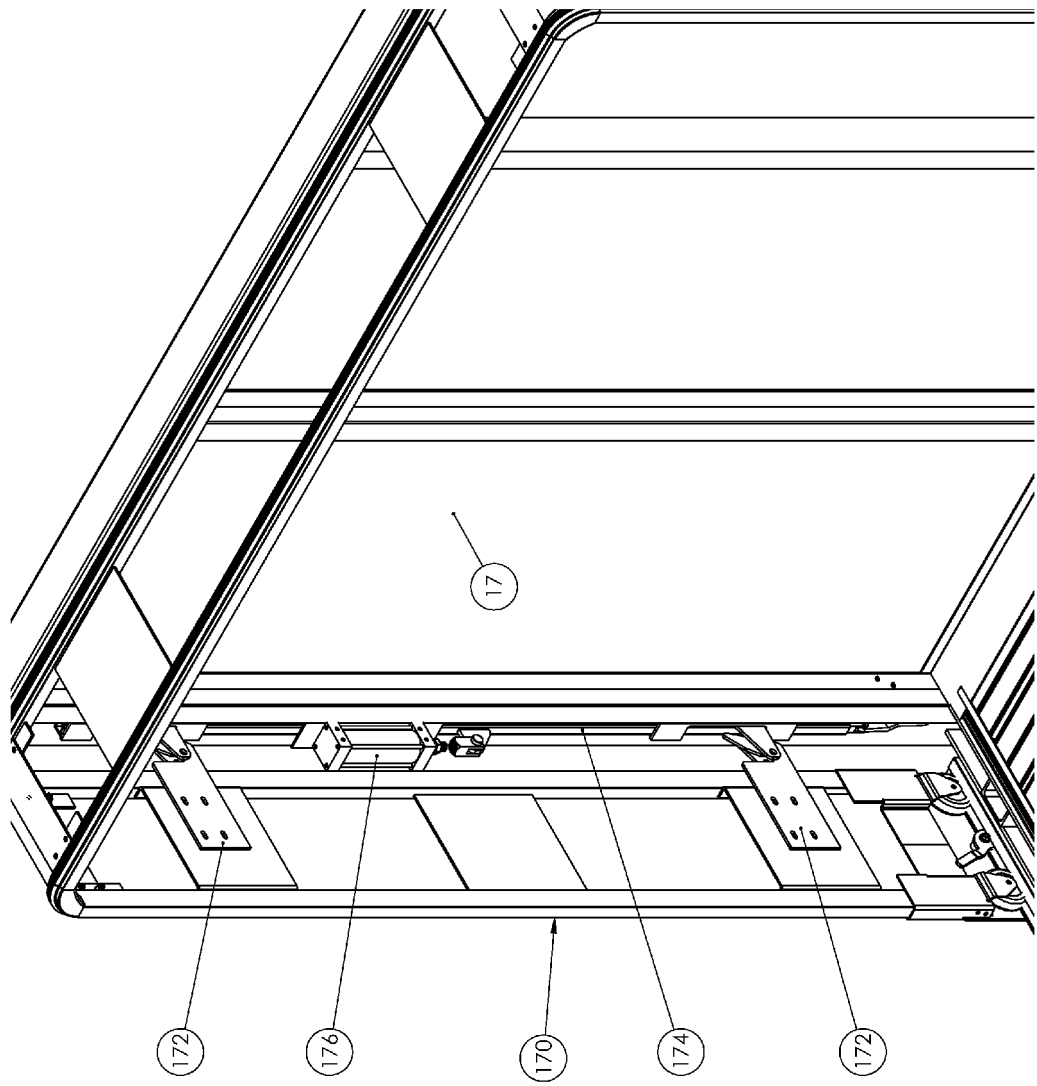

ROLLING TARP ENCLOSURE SYSTEM

BACKGROUND OF THE INVENTION

1. Field of the Invention

This invention relates to an improved rolling tarp enclosure system. More particularly, the invention relates to several improvements for a retractable tarp enclosure system which may be used for covering substantially any area or object, including swimming pools, beds of trucks, flatbed trailers and the like. More particularly, the present invention relates to such a rolling tarp enclosure system with improvements to a rail and rolling carriage arrangement thereof, to tensioning arrangements thereof, to corner portions of end sections thereof, and to other aspects of the rolling tarp enclosure system.

2. Discussion of Background Art

Rolling tarp covering and enclosure systems have long been known for use in a wide variety of applications, including tents, greenhouses and other space enclosures, awnings, swimming pool covers, vehicle load covers, etc. When such systems are provided on vehicles such as flatbed trailers, some aspects of the systems take on special significance, including appropriate tensioning of the tarp as disposed on the vehicle such that the tarp can sufficiently withstand external forces applied thereto while the vehicle is traveling, especially at high speed, the ability to keep water, dirt, and other foreign matter from entering inside of the tarp cover while the vehicle is traveling, the ability of the tarp system to extend at different levels along a vehicle surface which extends at the different levels, such as a so called "drop deck" flatbed trailer, etc.

A rolling tarp cover system will typically include wheeled carriages, skids, and/or other mechanisms which permit the cover system to be moved to various positions, and may include a drive assembly for facilitating the movement of the tarp cover rather than manually pushing or pulling it to a desired position. Also, a movable tarp cover system will typically include mechanism(s) for securing or locking the cover system in various positions, such as a fully closed or covering position and a fully retracted or non-covering position, and will also typically include mechanism(s) for tensioning the tarp cover when it is disposed in a fully covering position thereof for improved aerodynamics, appearance and durability. Some of the known tarp tensioning mechanisms are structurally associated with the mechanisms which permit the cover system to be moved and some are not.

Applicant has previously proposed several cover systems which may, for example, be used for covering loads on flatbed trucks/trailers as a so-called rolling type tarpaulin system, see for example U.S. Pat. Nos. 5,924,759, 7,854,465, and 8,047,600. These prior systems include a plurality of inverted U-shaped bows supporting a flexible cover, and rails provided along opposite sides of the truck bed which support ends of the bows through wheeled carriages such that the tarp cover may be easily moved longitudinally along the bed permitting the tarp to be extended over the bed or collapsed in an accordion-like manner, as well as locking mechanisms for the two ends of the tarp enclosure which also permit the tarp enclosure to be tensioned at either/both ends. The disclosures of U.S. Pat. Nos. 5,924,759, 7,854,465, and 8,047,600 are incorporated herein by reference.

While the conventional cover systems, including those previous systems proposed by applicant, are generally effective for their intended purposes, the conventional systems remain to be improved upon in various aspects thereof.

Rear Locking and Tensioning Mechanisms

In many truck mounted rolling type tarpaulin systems there is typically provided some type of locking and tensioning mechanism associated with the rear end of the system, whereby when the system is in its fully covering position and the front bow is locked in position, e.g., in engagement with the headboard at the front of the truck trailer, the tarp cover can be stretched tight by moving the rearmost supporting bow rearwardly a few inches. In the applicant's previously proposed systems in U.S. Pat. Nos. 7,854,465 and 8,047,600, there is disclosed a conventional tensioning and locking mechanism for the rear end of the cover system, which is shown in FIG. 7A thereof. The previously proposed system includes a movable catch provided with a rotatable screw rod, which catch engages and selectively moves a rearmost rolling carriage, which is operatively connected to a rear end of the tarp cover, rearwardly so as to tension the tarp cover and to lock the rearmost rolling carriage in the tensioned position. The catch is movable in the longitudinal direction of the cover system by cranking the rotatable screw rod. Another tensioning mechanism for rolling type tarp cover systems is known under the name "Loc-N-Load Mechanism", one example of which is disclosed in U.S. Pat. No. 7,798,553.

While such previously disclosed tensioning mechanisms function appropriately for tensioning the tarp cover, they have limitations associated therewith. For example, while the applicant's prior locking tensioning mechanism in U.S. Pat. Nos. 7,854,465 and 8,047,600 functions appropriately to tension the tarp cover, it only engages the rearmost carriage at the bottom portion of the tarp cover which makes it somewhat challenging to tension the tarp cover fully to the upper end thereof. Also, when the rearmost supporting bow is fully tensioned, it may have a slight tilt to the vertical axis. This is acceptable, but some additional means should be provided to prevent any undue or unbalanced forces from being applied to the wheels of the rearmost rolling carriage because undue or unbalanced forces would significantly shorten the useful life of the wheels.

Regarding the Loc-N-Load Mechanism, this is specifically designed for rolling tarp cover systems having rolling carriages with wheels disposed inside of a rail along which the carriages move because the Loc-N-Load Mechanism is disposed directly above the rail. Conversely, the applicant's rolling tarp system, commercially sold under the trademark Quick Draw™, has rolling carriages with wheels that roll along the top of the rail, and hence cannot use the Loc-N-Load Mechanism because it would interfere with movements of the rearmost rolling carriage.

Applicant has also previously proposed another type of locking and tensioning mechanism for the rear end of a truck mounted rolling tarp cover system as disclosed in relation to FIG. 11 of U.S. Pat. Nos. 7,854,465 and 8,047,600, as well as in present FIG. 7. This other type of mechanism, which is also disposed inwardly of the tarp cover at a rear portion thereof, is generally triangular in shape and functions to better and more uniformly tension the tarp cover in comparison to the prior mechanism shown in FIG. 7A of the prior patents because it applies the rearward tensioning forces to a vertically intermediate portion of the rear bow which supports the tarp cover.

Applicant's previous locking and tensioning mechanism 100 is generally triangular in shape, attaches to the floor of the flatbed trailer, has a rearward facing hook 102 at its upper end which engages an projection or puck fixed to and extending inward of a vertically intermediate portion of the rear bow, and includes a moveable portion including a rotatable screw rod 108 which, when rotated, moves the hook for thereby locking and tensioning the rear bow relative to the trailer. The mechanism includes a lower horizontal leg 108 which is also the rotatable screw rod, a vertical leg 105, a diagonal leg 106, a first bracket 104 and a second bracket 104' all connected together in the generally triangular shape. The first and second brackets 104', 104" rotatably receive and support opposite end portions of the lower leg 108, and are operatively secured to the flatbed trailer, whereby an operator may rotate the lower leg 108 with a crank handle 107 or the like engaged to a rear end of the lower leg 108 for thereby moving the hook 102 to a desired position.

The first bracket 104 is fixed to the flatbed trailer at a specific locations near the rear end of the lower leg 108, while the second bracket 104' is connected to the flatbed trailer such that it may move linearly relative to the trailer in the front-rear direction. The second bracket 104' includes a threaded nut that receives a threaded front section of the lower leg 108 therethrough. Rotation of the lower leg 108 causes the second bracket 104' to move along the threaded front section of the lower leg 108, and correspondingly the lower end of the diagonal leg 106, which is pivotally connected to the second bracket 104' also moves along the threaded front section of the lower leg 108. This in turn causes the hook 102 at the upper ends of the diagonal leg 106 and the vertical leg 105 to move in an arc pattern, which due to engagement of the hook 102 to the intermediate portion of the rear bow, also moves the rear bow in the front-rear direction, and to a lesser extent in the up-down direction. For example, for tensioning the tarp cover the lower leg 108 may be rotated clockwise which moves the second bracket 104' closer to the first bracket 104. The diagonal arm 106 and vertical arm 105 are thereby rotated rearward, which moves the hook 102 and the rear bow it engages rearward thereby tensioning the tarp cover. At this time the hook 102 and rear bow are also moved slightly upward, which also lifts the rolling carriages connected to lower ends of the rear bow slightly upward. This is very advantageous because the main wheels of the rearmost carriages are thereby lifted off of the rail, preventing any load or stress from being applied to the wheels when the tarp cover is in a tensioned state, and greatly extends the life of the wheels.

The previous system allows for several inches of tensioning distance which is generally sufficient for producing sufficiently high tension on the tarp for full size truck and trailer applications over the life of the tarp system, even as the tarp cover stretches somewhat over time, and because the wheels of the rearmost carriage are lifted off the rail no undue pressure is applied thereto. This previous system can be easily operated from ground level and is located inside the tarp system to maintain aerodynamics and aesthetics of the system and vehicle.

Again, this locking and tensioning mechanism 100 previously proposed by the applicant is very effective for properly locking and tensioning the tarp cover. However, it also has some limitations associated therewith. For example, it must be precisely positioned relative to the puck connected to the intermediate portion of the rear bow for properly tensioning same. This creates some difficulties during initial installation of locking and tensioning mechanism 100, as well as throughout the life of the tarp cover system as it may become necessary for a driver to remove and re-install, or reposition the locking and tensioning mechanism 100 on location wherever the trailer may be disposed at any given time. This complicates the work required by persons installing and operating the system, and may lead to safety issues if done too hastily or otherwise improperly. Also, while the mechanism is relatively compact it does project into the cargo space of a flatbed trailer more than the mechanism shown in FIG. 7A of U.S. Pat. Nos. 7,854,465 and 8,047,600.

Generally, each of the applicant's prior locking and tensioning mechanisms is sufficient for properly locking and tensioning a tarp cover system when used in pairs, e.g., a pair of the mechanism shown in FIG. 7A of the prior patents are provided in association with the rearmost carriages supporting legs of the rearmost bow on opposite sides of the flatbed trailer, or a pair of the mechanism 100 shown in FIG. 7 herein are provided in association with the supporting legs of the rearmost bow on opposite sides of the flatbed trailer.

Drop Deck Flatbed Trailers

Some flatbed trailers have portions which extend at different levels, e.g., a middle portion of the flatbed is disposed at a lower level than one or both ends of the flatbed. Such flatbed trailers may also be equipped with rolling type tarp cover systems, but such systems have conventionally required a second section of rail for being disposed at the higher level and extra rolling carriages for rolling on the second section of rail at the higher level, and/or other modifications in order to permit the tarp cover to be fully moved in the front or rear direction, which significantly increases the cost of the system. Also, the second section of rail may interfere with some movements of the system.

Rolling Carriages and Support Rails for Same

The applicant's commercial version of its rolling tarp cover system sold under the trademark Quick Draw™ has rolling carriages with wheels that roll along the top of the rail, details of which are explained in U.S. Pat. No. 5,924,759, whereas most other types of commercially available rolling type tarp cover systems having rolling carriages with wheels that are disposed within the rail. The rolling carriages with wheels that roll on top of the rail are typically more advantageous than the rolling carriages with wheels disposed within the rail for various reasons, including no restriction on size of the wheels for increased load capacity and durability. Even with the rolling carriages with wheels that roll on top of the rail, however, there are practical limits on the size and durability of same. Also, some rolling tarp systems are quite large and/or exposed to particularly significant external forces during use, such that there is a desire for a rolling carriage that can be reliably used with the larger systems and with systems that are exposed to particularly significant external forces during use.

Generally, the wheeled carriages, which are formed primarily of steel plates welded or otherwise connected together, together with the main wheels (whether they ride on top of the rail or inside of the rail) and other smaller wheels which provide stability of the carriages as they roll along the rails, constitute a primary portion of the tarp cover system, and the industry is always looking for manners of improving the carriages in terms of durability, cost, weight, and/or maintainability.

Further, with the vehicle-mounted rolling tarp systems there is often a need for additionally securing the cargo disposed on the flatbed trailer within the rolling tarp system, e.g., if the cargo's weight and/or shape tends to make it unstable. For such purpose additional mechanisms for securing the cargo may be provided, but it is typically necessary that any such mechanisms must disposed be inside of the tarp cover in order to maintain integrity of the tarp cover system when disposed in the fully covering position thereof, and also because government regulations strictly limit the size/width the rolling tarp systems. Disposition of the additional securing mechanisms within the tarp cover system, however, undesirably reduces the amount of usable cargo space within the tarp cover systems. Hence, there is a need for an additional securing mechanism which can be appropriately used with the rolling tarp cover systems, but which minimally reduce the amount of usable cargo space within the tarp cover systems and meet government regulations.

Support Bows and Lifter Bows

Referring to FIG. 11 of the present drawings there is shown a flatbed trailer having a rolling tarp cover system 1 disposed thereon according to a system previously proposed by the present applicant, with a portion of the tarp cover broken away to show details of the support bows and lifter bows of the system. The depicted system includes support bows 114 and lifter bows 112, with one support bow and two lifter bows having lower ends thereof supported by the wheeled carriages 16 that roll along the rails 4 of the system. Alternatively, the system may include four of the lifter bows having ends supported by each of the wheeled carriages, with two of the lifter bows on each side of the support bow.

The support bows 114 provide the main support for the tarp cover and have a much more rugged construction than the lifter bows 112 which function to keep the top portion of the tarp cover from sagging between the support bows when the cover system is in its fully deployed, covering position. The vertically extending ends of the support bows 114 are fixed to longitudinally intermediate portions of the wheeled carriages 16, while lower extending ends of the lifter bows 112 are pivotally connected to the wheeled carriages 16 on opposite sides of the support bows 114 so that the lifter bows 112 can be moved away from the support bows 114 when the tarp cover is extended and moved adjacent to the support bows 114 when the tarp cover is collapsed.

The tarp cover of the system may be formed in sections rather than as one large continuous member for ease of handling and maintenance, with adjacent sections of the tarp cover being joined together where they are connected to the support bows 114 such that the tarp cover appears to be one continuous member. On the other hand, the lifter bows 112 may have upper, longitudinally extending portions thereof connected to the tarp cover at positions intermediate two adjacent ones of the supporting bows 114 using hook-and-loop fasteners or the like, so that the lifter bows 112 are automatically disposed adjacent the support bows 114 when the tarp cover is in a collapsed position thereof, and automatically moved away from the support bows 114 as the tarp cover is moved to its fully deployed or covering position so that they prevent the tarp cover from sagging at positions between the support bows 114 when in the fully deployed position.

While the previously proposed system including such support bows 114 and lifter bows 112 functions very well in supporting the tarp cover in the applicant's previously proposed system, the cost of same is significant. For example, with reference to FIG. 12 of the present drawings, the applicant's current commercial system, sold under the name of QUICK DRAW™ include a heavy duty corner section 116 for its support bows including two mating halves which are generally triangular in shape, die cast from aluminum and fastened together in surrounding relation to the ends of vertical and horizontal sections 92 of the bow that come together in the corner using bolts (not shown) which extend through openings formed in inwardly project-ing web portions 116' of the mating halves. Further, and with reference to FIG. 13 of the present drawings, the lifter bows of the applicant's commercial system include vertical and horizontal portions formed in straight sections of aluminum tubing 93, with plastic corner members 118 that connect vertical and horizontal straight sections of the aluminum tubing sections 93 that come together in the corner such as shown, and ends of the vertical sections of aluminum tubing 93 are connected to pivoting plastic members provided on the wheeled carriages by having the plastic members inserted into the ends. For example, the plastic corner members 118 may include a pair of elongate, curved plastic members 120 associated with a pair of the lifter bows 112, each of which has opposite ends 120' with an outer diameter slightly smaller than the inner diameter of the sections of the aluminum tubing 93 so that the ends of the tubing 93 may be securely fitted over the ends 120' via friction engagement, and each corner member 118 includes an intermediate pivot connection 119 that connects the pair of plastic members 120 near ends thereof and permits the pair of lifter bows 112 joined by the corner member 118 to pivot toward and away from each other when the tarp cover is collapsed and extended. Hence, the applicant has investigated manners of reducing the cost of same, while still achieving appropriate functionality and durability.

As will be understood from the foregoing, a need still exists in the art for an improved rolling type tarp cover system which addresses and overcomes the above-discussed limitations and disadvantages of the conventional rolling type tarp cover systems.

SUMMARY OF THE INVENTION

The present invention has been created with the intention of meeting the discussed need.

It is an object of the present invention to provide a rolling type tarpaulin cover system for a flatbed trailer including improved tensioning mechanisms for a rear end of the system which permit easier and safer use and adjustment thereof, and which are also more durable.

It is another object of the present invention to provide a rolling type tarpaulin cover system for a drop deck flatbed trailer which conveniently permits the tarp cover to be smoothly moved fully forward and fully rearward, and which has a simplified, economical construction with fewer parts.

It is yet another object of the present invention to provide a rolling type tarpaulin cover system which can reliably handle larger and heavier tarp covers, as well as greater external forces over extended time periods.

It is a further object of the present invention to provide auxiliary cargo securing mechanisms for a rolling type tarp cover system which are convenient to use, meet government regulations, and minimally reduce cargo space within the tarp cover as disposed on a flatbed trailer.

It is still another object of the present invention to provide alternative constructions for various portions of the rolling tarp cover system which are reduced in weight, complexity, and/or cost, but which still achieve excellent reliability and durability.

Yet another object of the present invention is to provide a mechanism which can reliably lock the rolling carriages of the system in any desired position along the rail on which they are movably supported, and which also has a simple, convenient structure.

For a more complete understanding of the present invention, the reader is referred to the following detailed description section, which should be read in conjunction with the accompanying drawings. Throughout the following detailed description and in the drawings, like numbers refer to like parts.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific embodiments of a cover system according to the invention and specific alternative structures and modifications thereto, the embodiments chosen for the purposes of illustration and description of the structure and method of the invention are shown in the accompanying drawings forming a part of the specification.

BRIEF DESCRIPTION OF THE DRAWINGS

FIG. 6 is a front view of an additional load securing bracket as disposed between the trailer and support rail of the rolling type tarp system according to an exemplary embodiment of the present invention.

FIG. 7 is a side view of a triangularly shaped locking and tensioning mechanism associated with a rearmost bow of the rolling tarp cover system according to a previously proposal by the applicant.

FIG. 10A is a side view of another modification of the applicant's previously proposed locking and tensioning mechanism of FIG. 7 which includes a fixed crank handle according to an exemplary embodiment of the present invention.

FIG. 10B is front view of the modification of FIG. 10A.

FIG. 19 is an end view of a rail and a rolling carriage having top rolling wheels and inner rolling wheels according to an exemplary embodiment of the present invention.

FIG. 20 is a perspective view of the embodiment of FIG. 19.

FIG. 22 is an outer perspective view of a locking mechanism used for latching a front rolling carriage to a headboard of the system according to an exemplary embodiment of the present invention, the locking mechanism being in an unlocked position thereof.

FIG. 23 is an inner perspective view of the locking mechanism of FIG. 22, the locking mechanism being in a locked position thereof.

DETAILED DESCRIPTION OF INVENTION

Figure 1A:
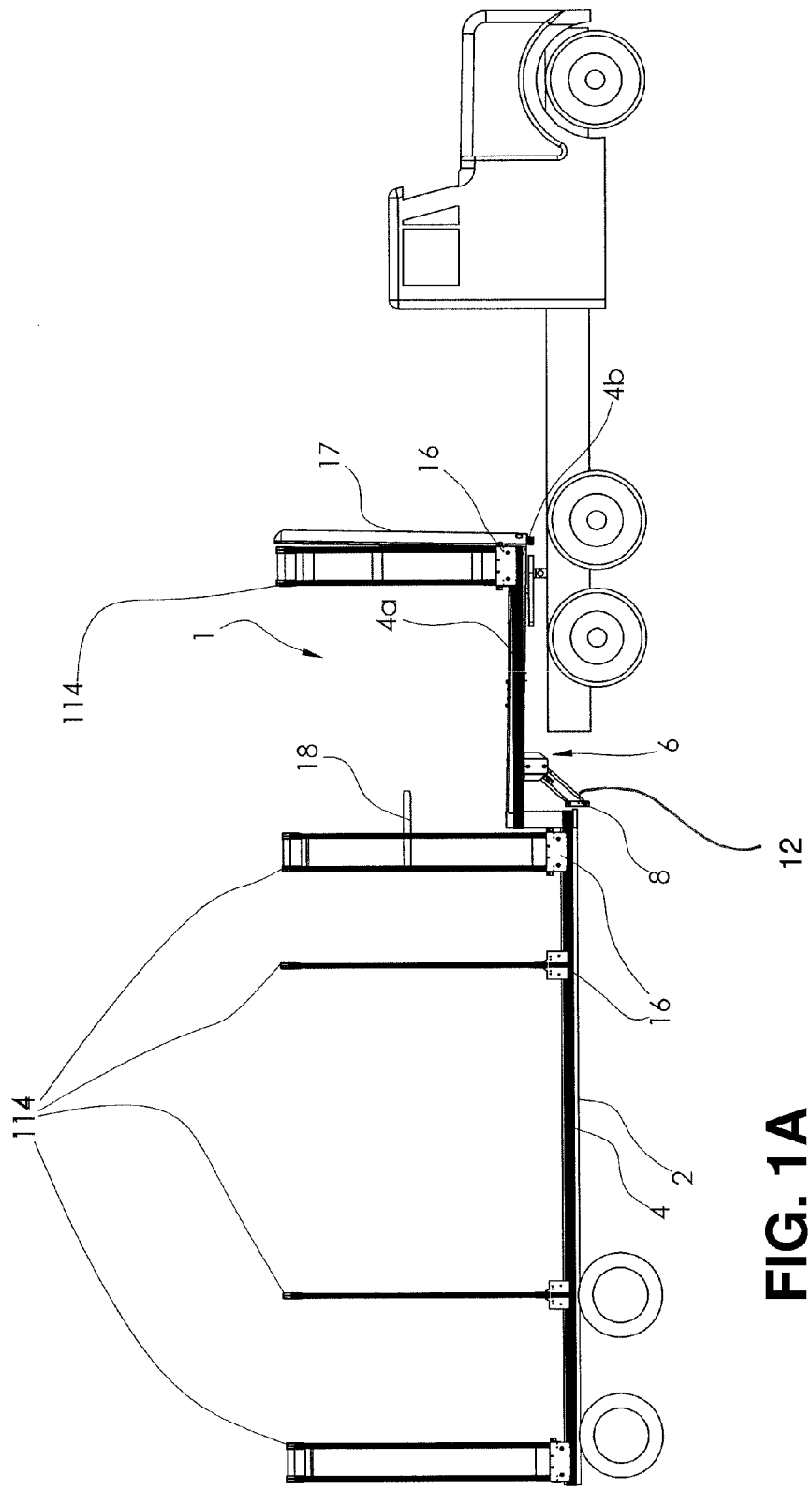
FIG. 1A is a side elevational view of a rolling type tarp cover system (tarp and lifter bows cover omitted for better understanding of the other components) disposed fully extended on a drop deck type flatbed trailer according to an exemplary embodiment of the present invention.

A number of selected illustrative and exemplary embodiments of the invention will now be described in some detail, with reference to the drawings. It should be understood that only structures considered necessary for clarifying the present invention are described herein. Other conventional structures, and those of ancillary and auxiliary components of the system, are presumed to be known and understood by those skilled in the art. These illustrative embodiments include locking and tensioning devices for tarp enclosure systems being mounted on flatbed trailers, other vehicles or the like, and various components of such systems.

Movable Rail for Systems Used on Drop Deck Trailers

Referring now to FIGS. 1A-1E of the drawings, there are shown side elevational views of a rolling type tarp cover system 1 disposed in various positions on a drop deck type flatbed trailer 2 according to an exemplary embodiment of the present invention. In these figures a tarp cover, which is an outermost component of the system, and lifter bows 112 are omitted for better understanding of the other components of the system.

Typically, the bed of a flatbed trailer will extend continuously at a given level along the full length thereof, and correspondingly a rolling type tarp system provided on the trailer typically includes a pair of elongate, continuous rails 4 extending along opposite sides of the flatbed trailer, a plurality of support bows 114 having an inverted U shape which support the tarp cover, and a plurality of rolling carriages 16 which support opposite ends of the bows, roll along the rails and permit the tarp cover to be moved from front-to-back or back-to-front for selectively exposing different portions of the flatbed trailer.

However, some flatbed trailers, commonly referred to as drop deck trailers, have portions which extend at different levels, e.g., a middle portion of the flatbed is disposed at a lower level than one or both ends of the flatbed. Such flatbed trailers may also be equipped with rolling type tarp cover systems, but such systems have conventionally required extra sections of the rail for being disposed at both of upper and lower positions of the drop deck, extra rolling carriages with some disposed at each of the lower and higher levels, and/or other modifications in order to permit the tarp cover to be moved in the front and/or rear directions. These extra components significantly increase the cost of the system, and may also interfere with some movements of the system.

According to the exemplary embodiment shown in FIGS. 1A-1E, the system 1 includes rails 4 fixed on opposite sides of the flatbed trailer 2 at a lower level corresponding to the flat support surface of the trailer flatbed, with movable front sections 4a which can be moved between upper and lower positions relative to the trailer by supporting mechanisms 6 respectively associated with the front sections 4a on opposite sides of the trailer, and front most sections 4b which may be fixed at a level corresponding to the upper position of the movable section 4a. The front most section 4b may have a length generally corresponding to that of a front rolling carriage 16 of the cover system and may be fixed to a headboard 17 of the system, which is convenient because this permits the movable section 4a to be raised and lowered independent of the front most section 4b, whereby the tarp cover of the system may be collapsed in a full forward position without having to unlock the headboard 17 from the rail.

As depicted, the mechanism 6 may include a first bracket 8 fixed to an undersurface of the flatbed trailer where a drop deck occurs, a second bracket 10 fixed to an intermediate portion of the front section 4a of the rail 4, and a plurality (two in the depicted embodiment) of links 12 having opposite ends pivotally connected to the brackets 8, 10, respectively, via pivot shafts connected to the brackets 8, 10. The rail section 4a may be easily, manually moved up and down by an operator while the rail section 4a remains supported by the mechanism 6 in a substantially horizontal orientation. In both of the upper and lower positions of the front rail section 4a a support surface thereof, which is engaged by wheels of the rolling carriages 16 for rolling movement therealong, faces upward.

Figure 1B:
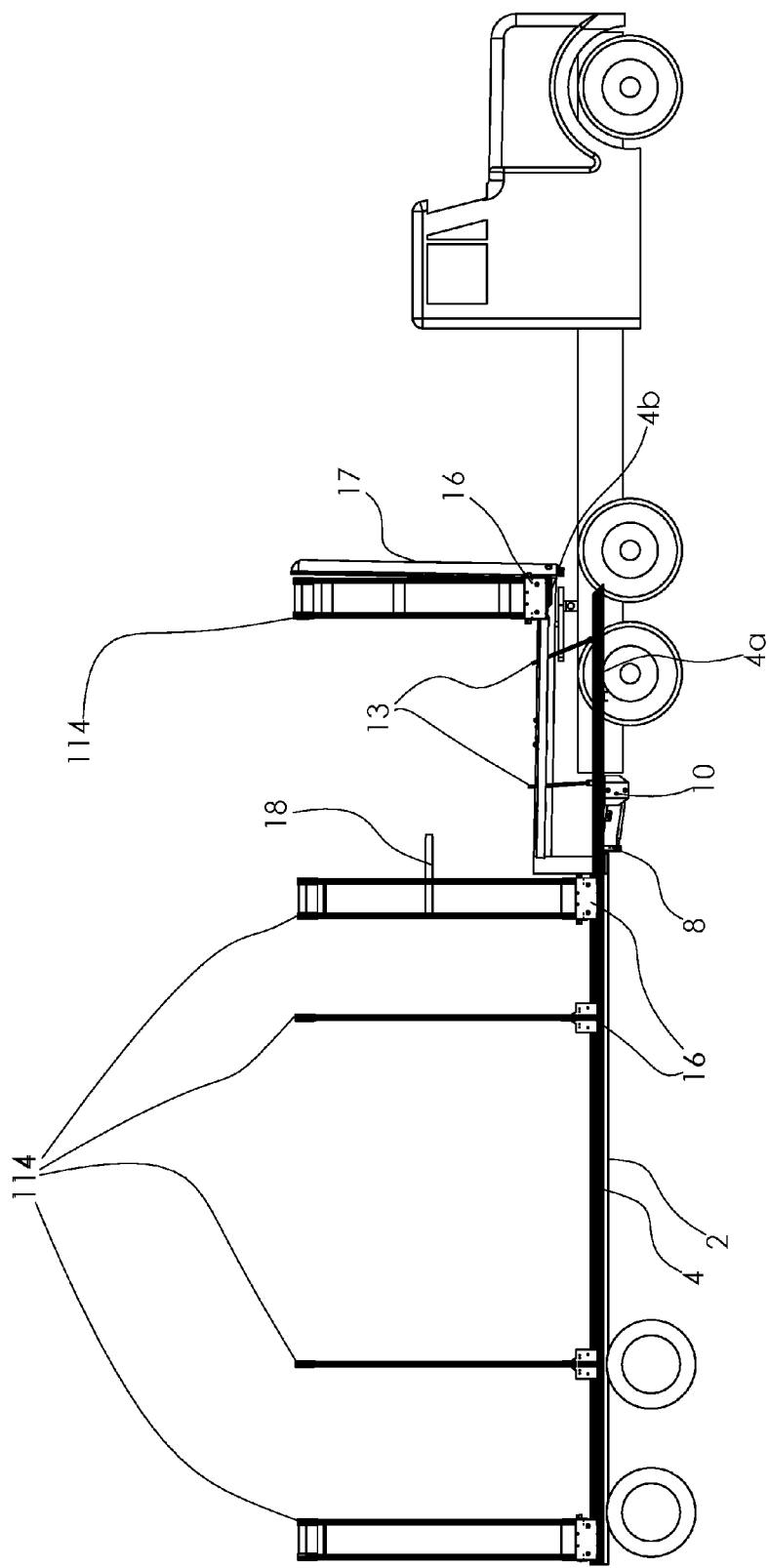
FIG. 1B is a side elevational view is similar to FIG. 1A, but wherein a front movable portion of a rail of the system is moved to a lower position thereof.
Figure 1C:
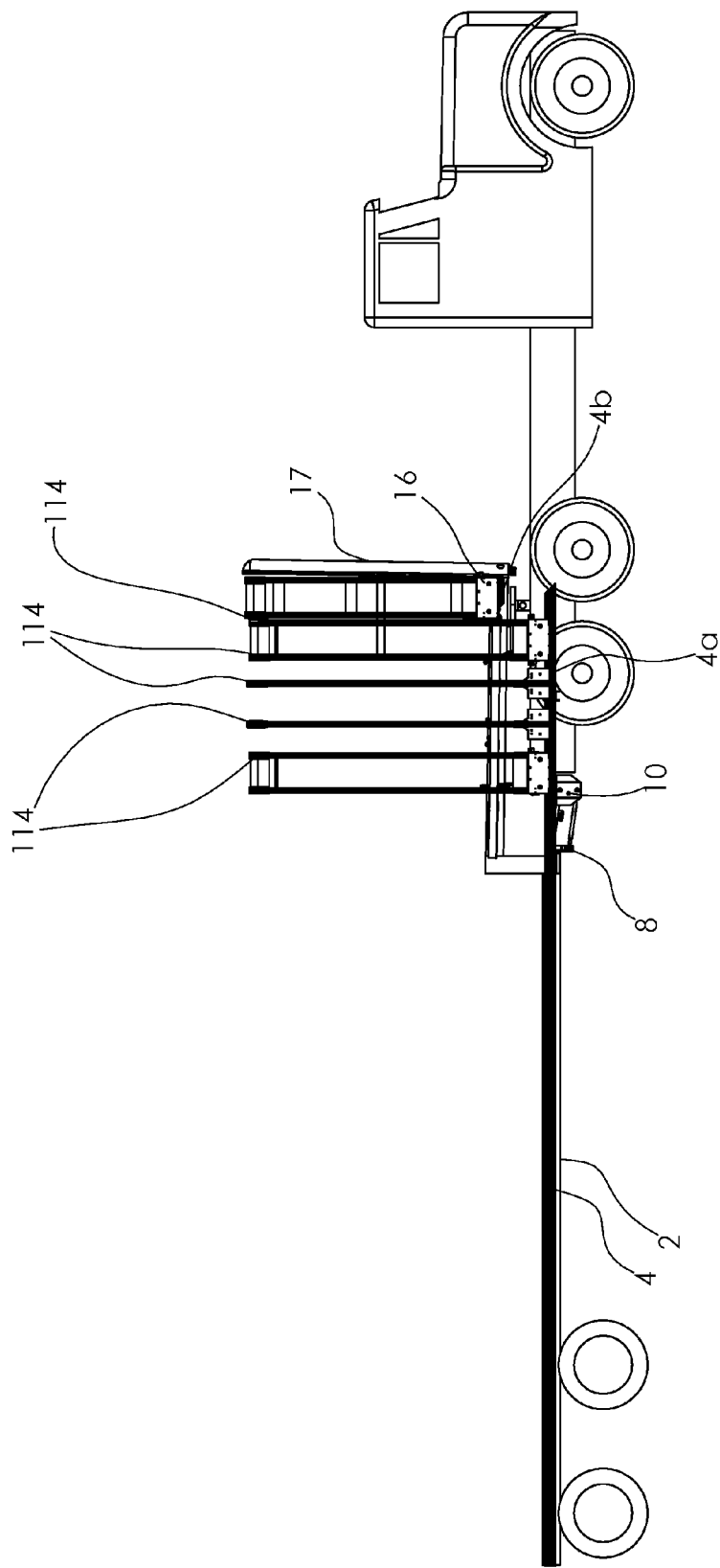
FIG. 1C is a side elevational view is similar to FIG. 1B, but wherein all the rolling carriages and bows are at forward most positions thereof.
Figure 1D:
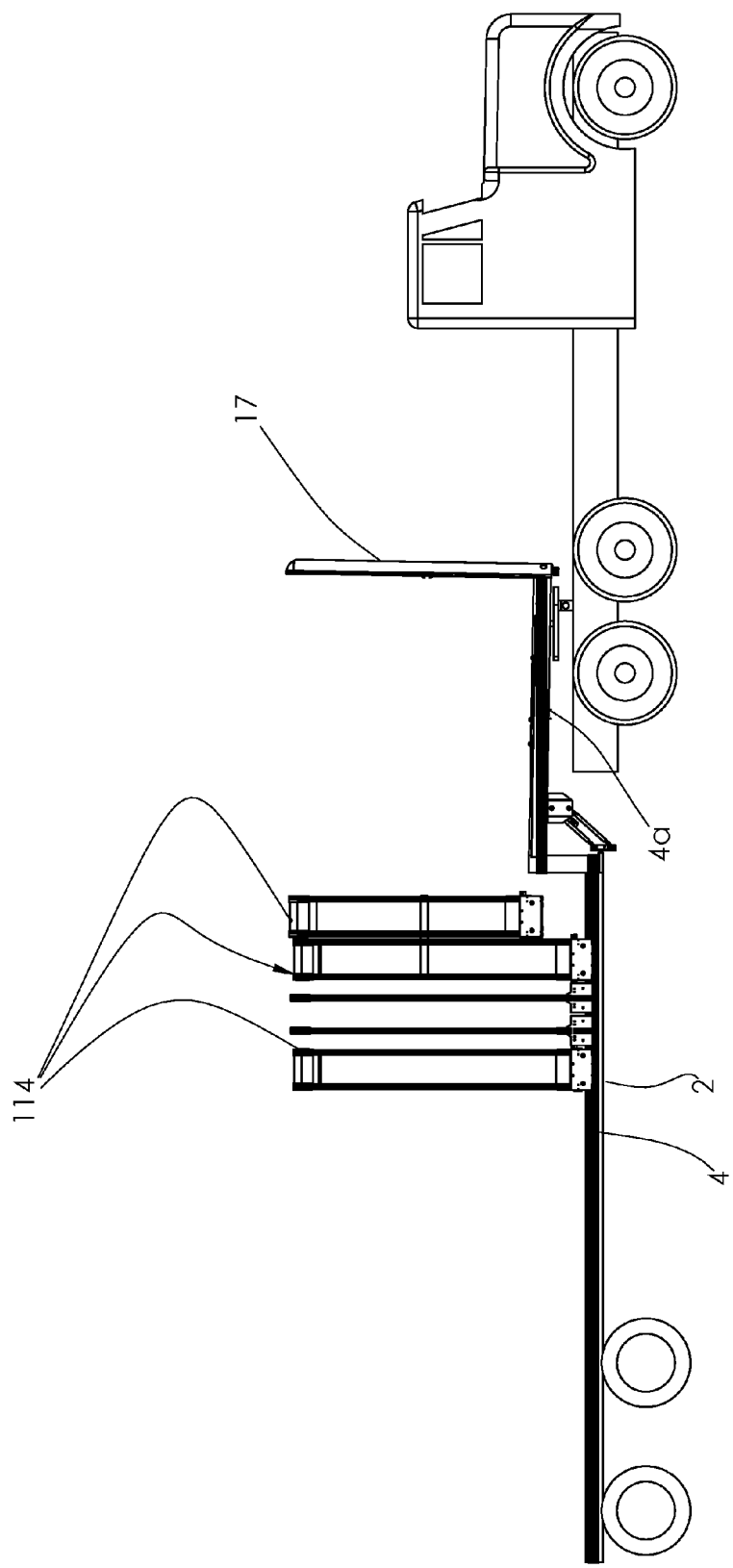
FIG. 1D is a side elevational view is similar to FIG. 1A, but wherein the rolling carriages and bows are at a longitudinally intermediate portion of the system.
Figure 1E:
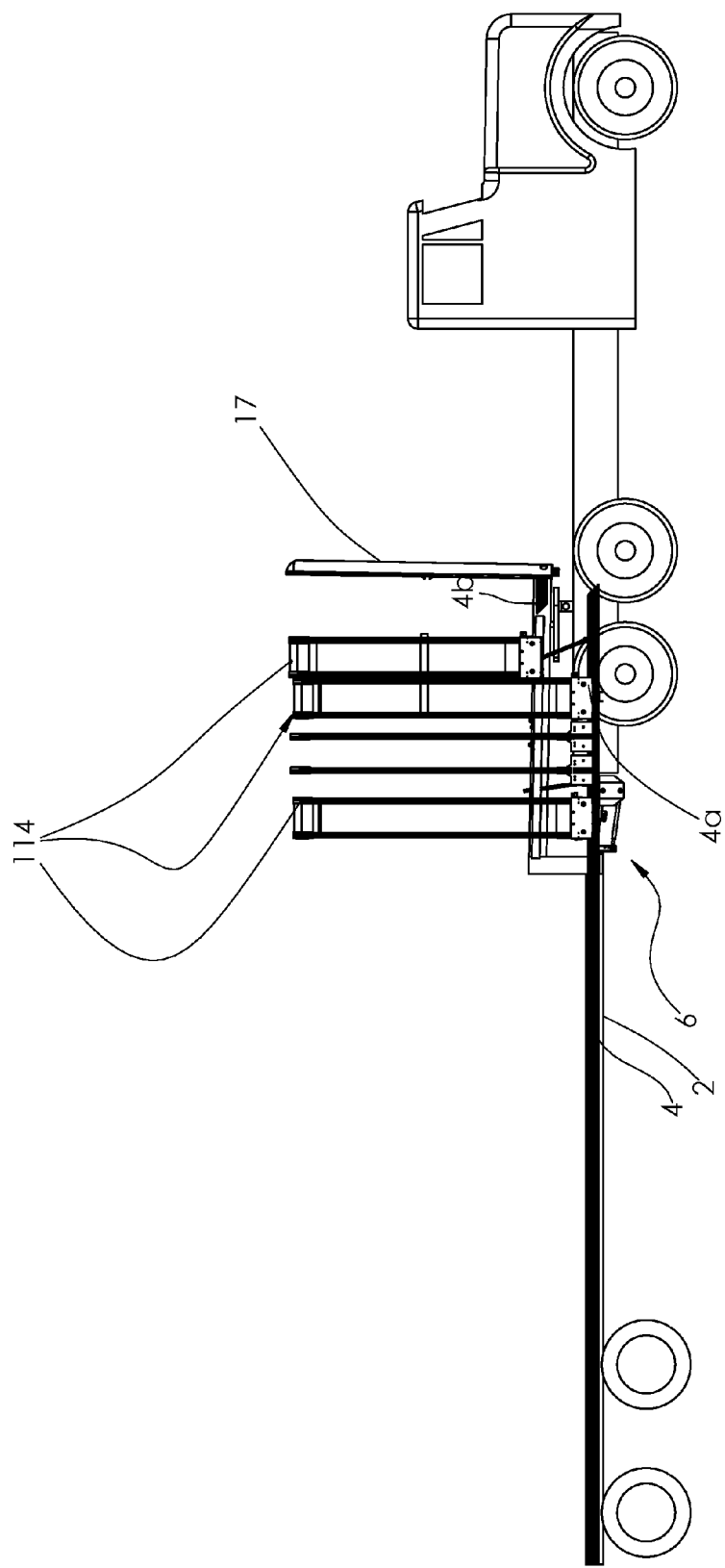
FIG. 1E is a side elevational view is similar to FIG. 1C, but wherein the rolling carriages and bows are moved close to the front of the system, but spaced away from the headboard.

A locking mechanism may be provided for securely locking front rail section 4a in its upper and lower positions and may include a pair of arms 13 pivotally connected to spaced portions of the front section 4a and extending upwardly through a space defined between a side of the flatbed trailer and a bump rail (not shown) typically provided on the flatbed trailers in parallel spaced relation to the side thereof, as shown in FIGS. 1B, 1E. When the front section 4a is in its lower position the arms 13 extend substantially vertically from the front section 4a, and a hook provided on the free end of at least one of the arms 13 securely hooks onto a support member provided on the bump rail and/or side of the flatbed trailer. Both of the arms 13 may be provided with the hooks on their free ends, but it is sufficient for at least one of the arms, e.g., the arm disposed forward, to be provided with the hook as in the depicted embodiment because the supporting mechanism 6 sufficiently supports the rear portion of the front section 4a. When the front section 4a is in its upper position the arms 13 extend substantially parallel to the front section 4a, and may be secured flat against support members provided on the bump rail and/or side of the flatbed trailer using a catch or the like (not shown). If desired, a motorized or non-motorized drive assembly (not shown) may also be provided to assist in moving the front section 4a of the rail.

At its upper position, as shown in FIGS. 1A and 1D, the front rail section 4a extends parallel and adjacent to the upper surface of the front section of the drop deck trailer 2 such that rolling carriages 16 associated with a front one of supporting bows 114 of the system, which is shorter than other bows 114 of the system, may operatively engage the front rail sections 4a and front most sections 4b. At its lower position, as shown in FIGS. 1B, 1C, 1E, the front rail section 4a extends parallel to but below the upper surface of the front section of the drop deck trailer 2, and along a common longitudinal axis with the main section of the rail 4, such that rolling carriages 16 associated with intermediate and rear support bows 114 of the system, which are longer than the front support bow 114 of the system, may smoothly pass from the main section of the rail 4 to the front section 4a, and operatively engage the front rail section 4a when all of the carriages 16 are rolled to front positions thereof, such as shown in FIG. 1C. In FIGS. 1D, 1E carriages of the shorter front support bow 114 are not engaged to any portion of the rail, while in FIGS. 1A-1C these carriages are supported on the front most section 4b of the rail. A coupling (not shown) may be provided between the main and front sections 4a of the rail 4, and between the front sections 4a and front most sections 4b, to assure that they remain in proper alignment with each other when the front section 4a is respectively disposed in the lower and upper positions thereof.

When the rolling carriages 16 associated with front bow 114 of the system do not operatively engage any part of the rail 4, the front section 4a or the front most section 4b, some additional support may be provided for the front bow and its rolling carriages so that no undue stress is placed on other parts of the system. As depicted, for example, a longer intermediate bow 114 of the system and its supporting carriages 16 may be constructed with increased size and strength similar to the front most and rearmost bows and their carriages, and this longer intermediate bow may be provided with one or more support bars 18 that project forwardly from the bow for being operatively engaged to and supporting intermediate portions of the shorter front bow 114 when the shorter front bow 114 is collapsed adjacent to the longer intermediate bow 114 as shown in FIGS. 1D, 1E.

Further, because the system according to the exemplary embodiment in FIGS. 1A-1E includes the third support bow 114 with increased size and strength similar to the front most and rearmost bows, it is also possible to eliminate one support bow 114 and its associated carriages 16 in this exemplary embodiment in comparison to other similarly sized systems. For example, a similarly sized, conventional, drop deck, rolling tarp system in which only the front most and rear most support bows are constructed with increased size and strength would typically have two of the shorter support bows that roll along the upper section of rail, but such second shorter support bow can be eliminated in the exemplary embodiment because the front most bow 114 and associated carriages 16 that extend onto the front most rail section 4b and the longer intermediate bow 114 having the support bar(s) 18 along with the associated carriages 16 have the increased size and may properly support the tarp cover even if the second shorter bow 114 and associated carriages 16 are eliminated.

Figure 1F:
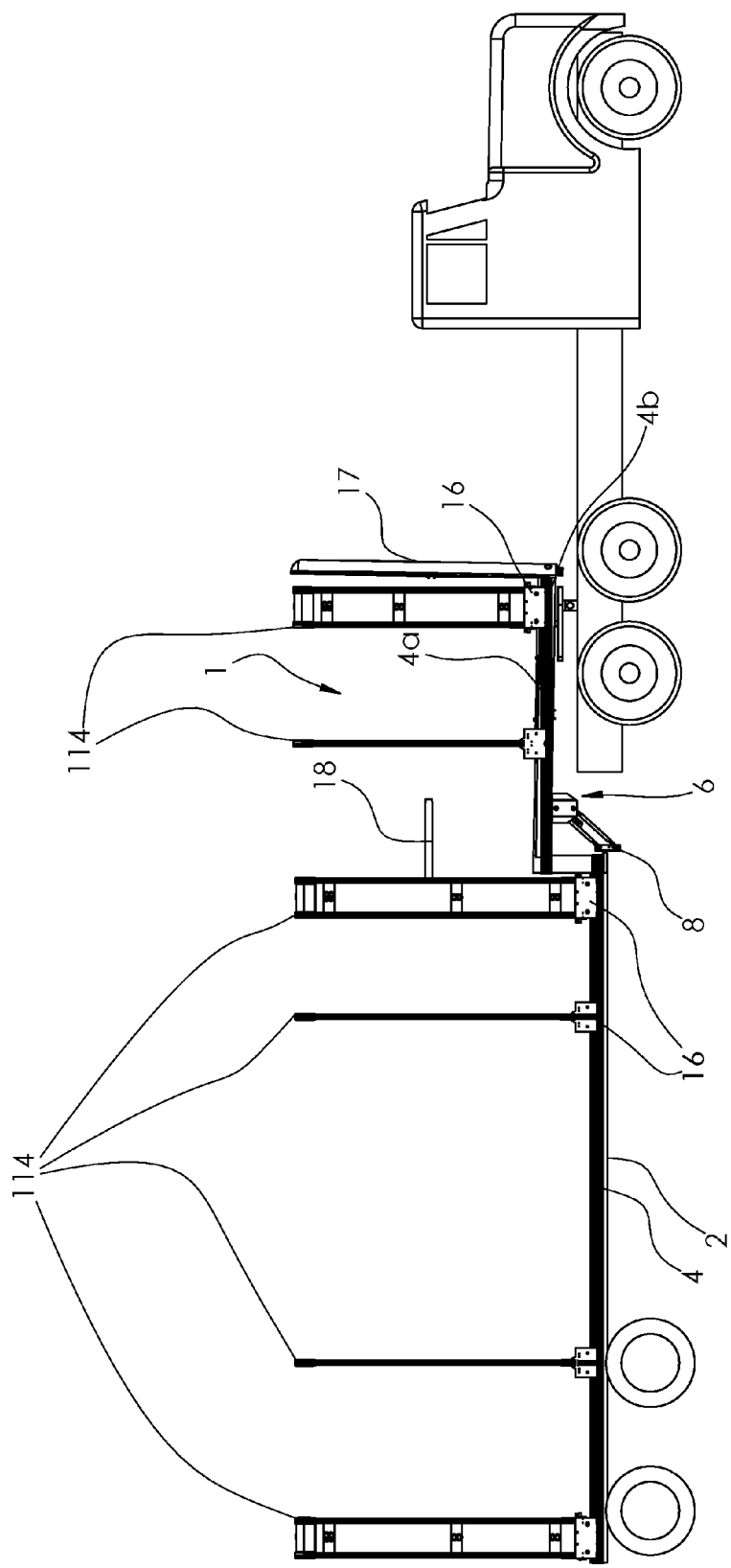
FIG. 1F is a side elevational view is similar to FIG. 1A, but showing a modification wherein an additional support bow is added near the front of the system and which rolls on the front movable portion of a rail when such portion is in a higher position thereof.
Figure 2:
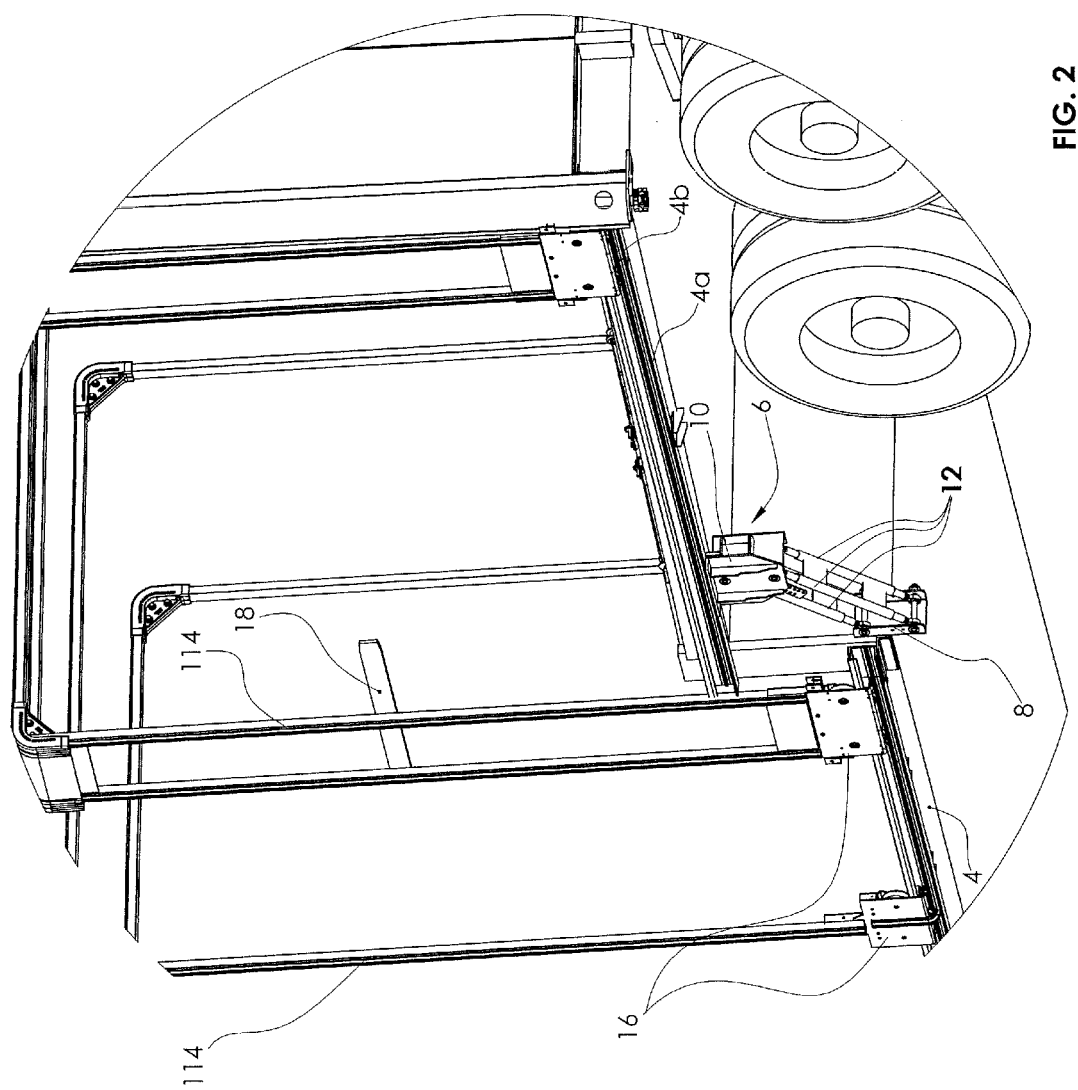
FIG. 2 is an enlarged perspective view of a portion of the system shown in FIG. 1F, showing a mechanism which supports a front section of a support rail of the system such that the front section is selectively movable between upper and lower positions.

While the system 1 shown in FIGS. 1A-2 includes the movable rail sections 4a only at the front thereof, it will be understood that movable rail sections and the other mechanisms associated therewith may be provided at the rear of the system, at both the front and rear thereof, or at any other desired portion(s) of the system.

Such embodiment as shown in FIGS. 1A-1E is advantageous over conventional rolling type tarp systems for drop deck type flatbed trailers 2 because it eliminates the conventional need for additional rolling carriages, additional rail sections, etc. for supporting the shorter bows and their rolling carriages when the shorter bows are disposed over lower sections of the trailer bed. While the system adds the supporting mechanisms 6 and locking mechanisms including the arms 13 for the front sections 4a of the rails 4, and the supporting bar(s) 18 projecting from the longer intermediate bow 14, these components are less expensive than the additional rolling carriages, additional rail sections, etc., conventionally provided, and are also relatively easy to manually manipulate so that no significant additional burden is placed on the operator. Also, because the front most section 4b is fixed to the headboard 17 it is easy to raise and lower the movable section 4a of the rail because no action is required for connecting and disconnecting the front section 4a relative to the headboard, and there is no difficulty in fully collapsing the system to the front and rear ends thereof.

With reference to FIGS. 1F and 2, there is shown a modification to the exemplary embodiment in FIGS. 1A-1E. According to the modification a second shorter bow 114 is provided that rolls along the front rail section 4a when the front section is in its upper position. Again, if this second shorter bow was eliminated the system would still function appropriately as in the embodiment of FIGS. 1A-1E, but including the second shorter bow may be desirable in some situations.

Rear End Locking and Tensioning Mechanisms
Mechanism for Rear Carriage

Figure 3:
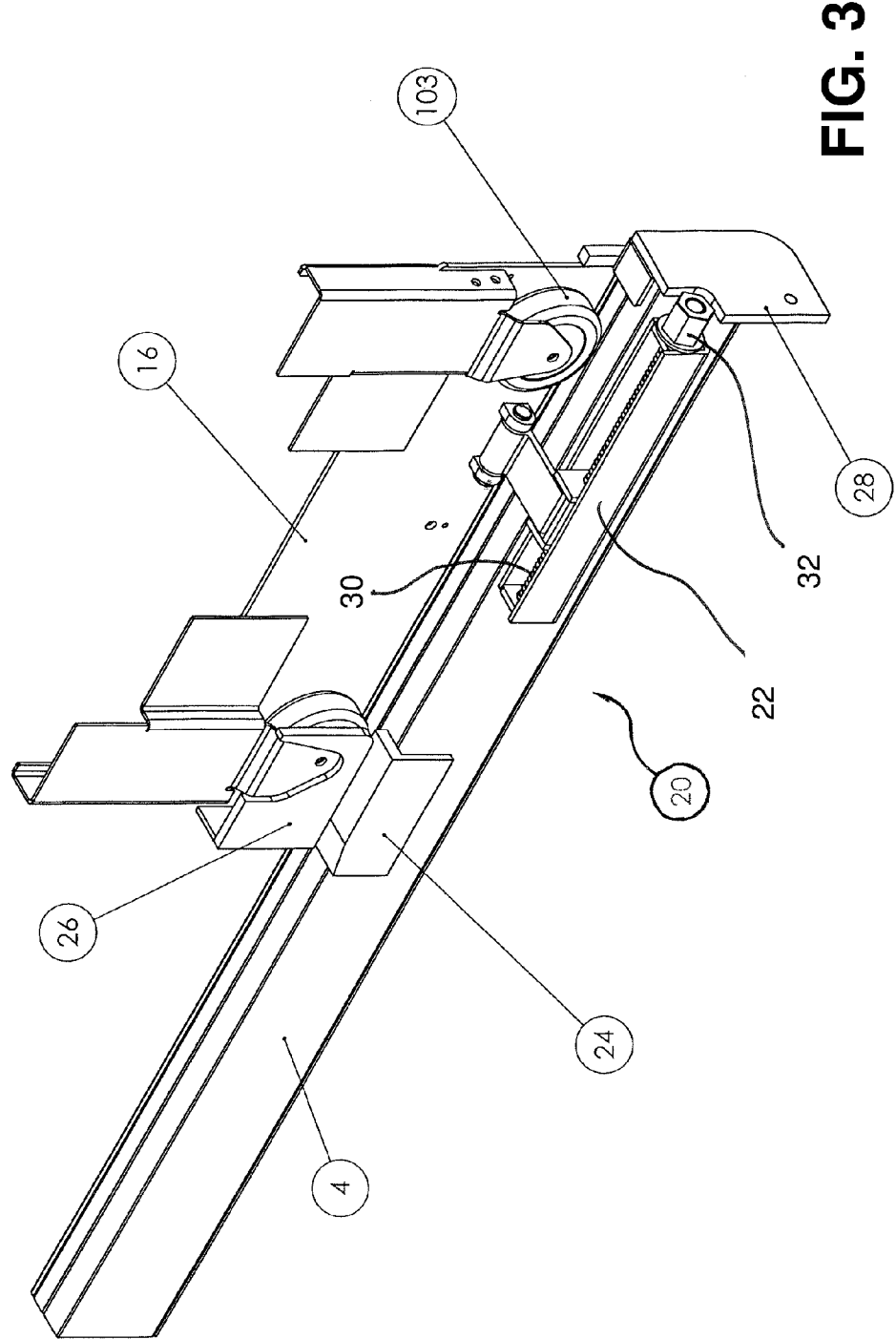
FIG. 3 is a perspective view of a locking and tensioning mechanism according to an exemplary embodiment of the present invention, together with one of the carriages 16 of the system 1 on the rail 4 in FIG. 1.
Figure 4:
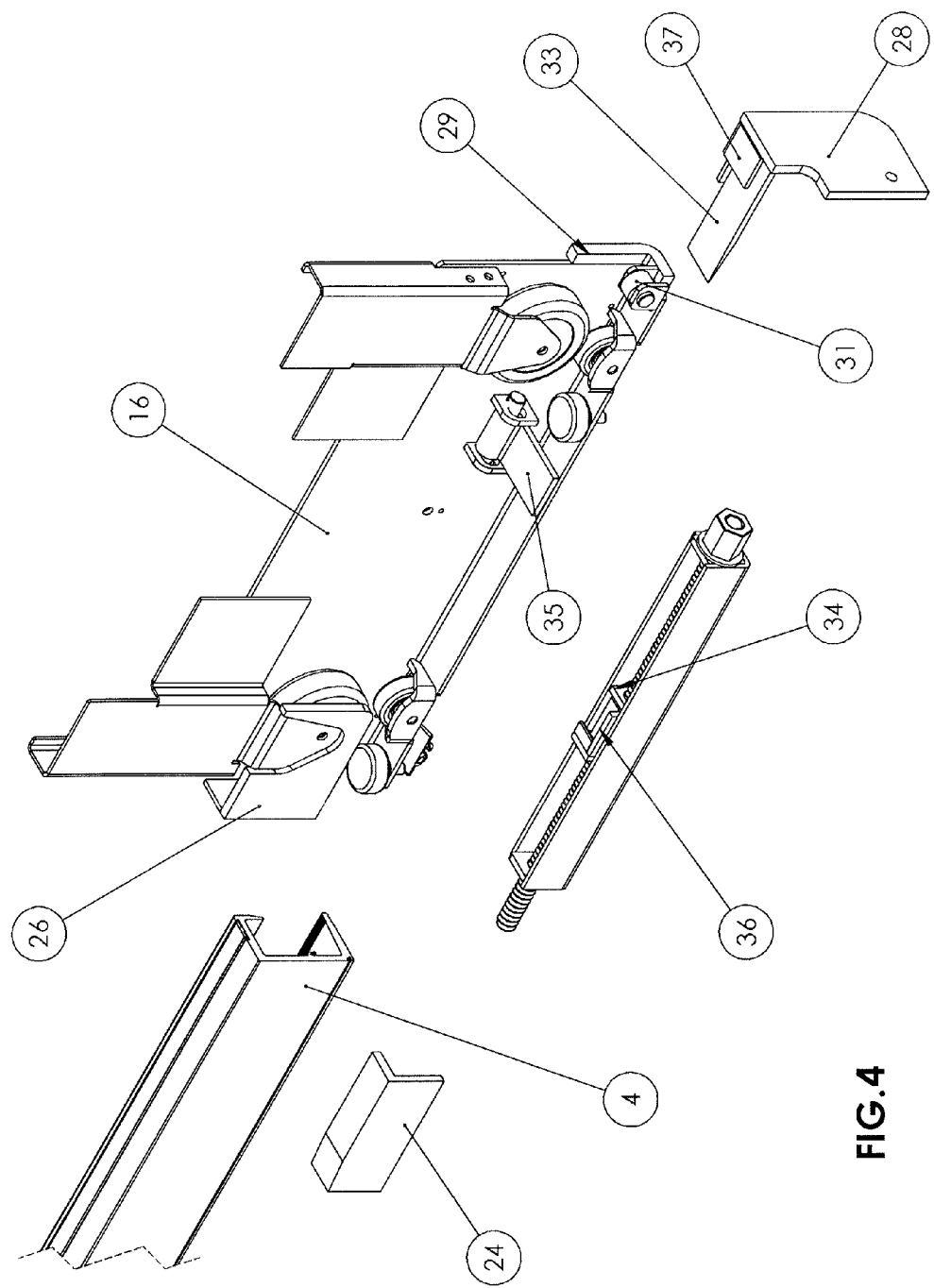
FIG. 4 is an exploded perspective view of the locking and tensioning mechanism of FIG. 3.

Referring now to FIGS. 3-4 of the drawings, there is shown a locking and tensioning mechanism 20 according to an exemplary embodiment of the present invention, which functions in association with one of the carriages 16 movably supporting the rearmost support bow 114 of the system 1 on the rails 4 provided on opposite sides of a trailer 2, such as shown in FIGS. 1A-1F. The illustrated embodiment is an improvement over a prior locking and tensioning mechanism of the applicant, such as shown in FIGS. 7A, 7B of U.S. Pat. No. 8,047,600. The mechanism 20 includes a screw rod device which may be fixed to the flatbed trailer 2 at an appropriate location, e.g., between a side of the trailer 2 and the rail 4 of the cover system which is provided in parallel along the side of the trailer 2, and which selectively engages a portion of the carriage 16 for moving the carriage 16 rearward to tension the tarp cover, and lifting mechanisms associated with front and rear portions of the carriage 16 to prevent undue stress from being applied to the main support wheels of the carriage 16 when the carriage 16 is moved rearward by the screw rod device.

The screw rod device may include a housing 22, a threaded rod 30 rotatably secured within the housing, which extends through one end of the housing and has a head 32 disposed outside of side wall which may be rotated using a manual or power driven cranking tool, a locking member 34 with a main body formed as a threaded nut having a central threaded opening defined therethrough for being disposed on the threaded rod 30 and a projection 36 which extends upward from the main body and may be selectively, operatively engaged with a member 35 provided on the carriage 16. When the threaded rod 30 is rotated the locking member 34 moves linearly along the threaded rod 30 and moves the carriage 16 along with it via the engagement between the member 35 and the projection 36. The member 35 may be pivotally connected to the carriage 16 such that it can be pivoted away from the carriage 16 to engage the projection 36 such as shown in FIG. 3 or pivoted flat against the carriage 16 when not engaged to the projection 36 to prevent or minimize contact with any other object as the carriage 16 is being moved.

The housing 22 may be relatively compact such that it may for example be conveniently and inconspicuously disposed in a space between the side of the trailer 2 and the rail 4 of the cover system, e.g., the housing 22 may be disposed in such space so that the upper surface of the housing 22 is flush or substantially flush with the upper surfaces of the rail 4 and the trailer 2, while the head 32 of the threaded rod 30 extending rearward from the housing 22 may be positioned slightly forward of the ends of the rail 4 and the trailer so that it is protected by these ends, but can be easily accessed for being cranked with an appropriate tool. As depicted, an end cap 28 formed of steel or other appropriate material may be provided at the end of the rail 4 which also shields the screw rod device, but has an opening defined at an upper corner thereof through which the head 32 of the screw rod 30 may be accessed with a cranking tool. The housing 22 may be fixed in such position to the rail 4 and the trailer 2 by welding, using fasteners such as bolts and/or other appropriate means.

The lifting mechanism associated with a front portion of the rear carriage 16 carriage may include a rigid member 24 made of steel or other appropriate material which may be fixed to the rail 4 and/or the side of the flatbed trailer 2, and a steel member 26 or other appropriate engagement member which is connected to the rear carriage 16 such that it is disposed inwardly of the front rolling wheel of the carriage 16. Member 24 may be L-shaped in cross section with an upper portion that lays flat on top of the upper surface of the rail 4. The upper portion may have a thickness of approximately ¼-½ inch such that projects above the upper surface of the rail 4 by a corresponding amount, it is not in the path of the rolling wheels of the rear carriage, and may have a tapered front edge so that the steel member 26 can easily slide onto the member 24 while lifting the front end and the front rolling wheel of the rear carriage 16 by an amount corresponding to the thickness of the member 24. By this arrangement the members 24 and 26 support the entire load at the front of the rear carriage 16 and the front rolling wheel of the rear carriage 16 is lifted off of the rail 4 so that no stress is placed on the front wheel when the tarp cover is in its tensioned position, which greatly increases the durability of the front wheel.

The lifting mechanism 24 associated with a rear portion of the rear carriage 16 may include a reinforcement member 29 formed of steel or other appropriate material, which may be L-shaped and attached to a rear, lower portion of the carriage 16, a rotatable bushing 31 formed of steel or other appropriate materials, which is secured to the rear lower portion of the carriage 16 and to the reinforcement member 29, and projections 33, 37 provided with the end cap 28 and projecting forwardly in parallel to the rail 4. The end cap 28 is fixed to the rail 4 by fasteners or other appropriate means and the projections 33, 37 are positioned such that when the carriage 16 is moved fully rearward the rear end of the upper wall of the carriage 16 is disposed between the projections 33, 37 and the bushing 31 engages the lower surface of the lower one of the projections 33. The engagement between these parts prevents undue pressure from being applied in a downward or upward direction to the rear portion of the carriage 16, including the rear main wheel 103, when the tarp cover is in its tensioned position, which also helps to increase the durability of both wheels 103.

For locking and tensioning of the rear carriage 16 using the mechanism 20, the carriage 16 is moved toward the rear end of the rail 4, the member 35 on the rear carriage 16 is folded down and is operatively engaged to projection 36, and then the head 32 of the threaded rod 30 is cranked to move the locking member 34 rearward, whereby the rear carriage 16 is also pushed rearward, and then further cranking of the head 32 is performed until an appropriate amount of tension is applied to the tarp cover.

The locking and tensioning mechanism 20 in this exemplary embodiment is very advantageous over conventionally known locking and tensioning mechanisms in the art because it is conveniently disposed at a position below and adjacent the rail 4 and rear carriage 16 so it will not interfere with the required movements of the carriage 16, it is relatively compact so that it does not take up much space within the cover system, it is easy to use, and it avoids any undue stress on the wheels 103 of the carriage 16 for increased durability. The steel member 26 could be replaced by a steel wheel or other appropriate means.

Figure 5B:
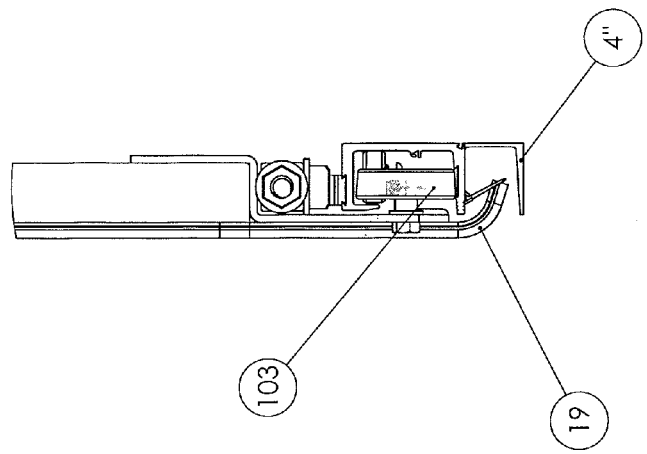
FIG. 5B is a front end view of the mechanism of FIG. 5A.
Figure 5A:
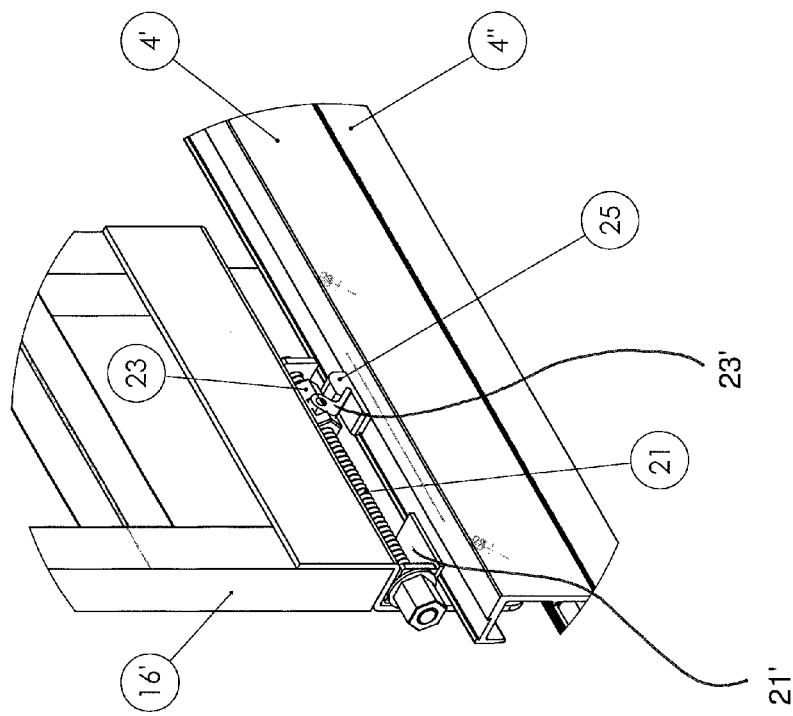
FIG. 5A is a rear perspective view of another exemplary embodiment of a locking and tensioning mechanism according to the present invention which is disposed at the rear end of the rolling tarp system and with a rolling carriage having main support wheels disposed within the rail.
Figure 5C:
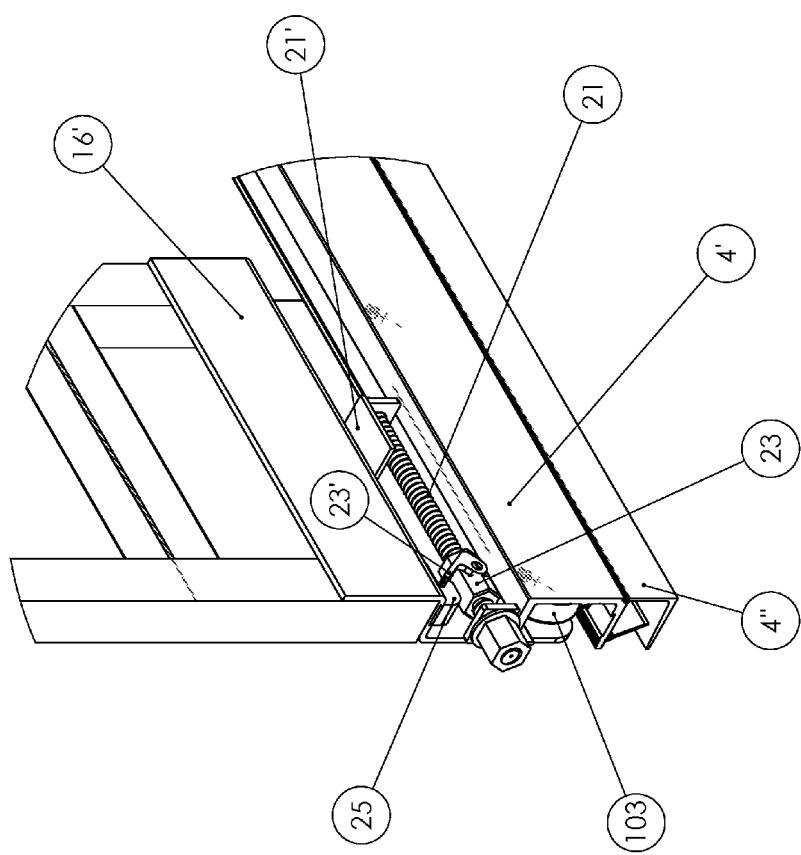
FIG. 5C is similar to FIG. 5A but shows a modification in which the screw rod is fixed to the rearmost rolling carriage rather than to the rail.

With reference to FIGS. 5A-5C there are shown views of other exemplary embodiments of a locking and tensioning mechanism for the read end of the rolling tarp system. FIG. 5A is a rear perspective view of another exemplary embodiment of a locking and tensioning mechanism which may be used in conjunction with a rolling carriage 16 having main support wheels 103 disposed within the rail 4', rather than on top of the rail 4 and with the screw rod 21 fixed to the rolling carriage 16', FIG. 5B is a front end view of the embodiment in FIG. 5A, and the exemplary embodiment in FIG. 5C is very similar to that of FIG. 5A except that the screw rod 21 is fixed to the upper surface of the rail 4 rather than to the rolling carriage 16.

As depicted in FIGS. 5A-5C, the rail 4' may have a similar structure as the rail 4 used in other embodiments of the invention except that it has a lower extension 4" with L-shaped cross section that extends below the main part of the rail 4 and a seal is connected to the lower surface of the main part of the rail 4 and extends inward of the lower extension 4" rather than being disposed in the main part of the rail. The seal contacts a so-called tarp clip 19 which is connected to a lower edge of the tarp cover 101 of the system to keep water, dirt and other foreign matter from entering inside of the tarp cover. The rolling carriage 16' is modified in comparison to the conventional carriage 16 in that the main support wheels 103 are disposed to roll within the main part of the rail 4' rather than rolling on top of the main portion, smaller keeper wheels normally disposed within the main part of the rail are eliminated because the main support wheels 103 as disposed within the main part of the rail 4' also perform the function of the keeper wheels, and the tarp clip 19 at the bottom of the carriage extends within the lower extension 4" to engage the seal, rather than extending within the main part of the rail 4 and engaging the seal there. Having the main support wheels 103 of the rolling carriage 16 disposed to roll along the upper surface of the rail 4 is advantageous because the size of the wheels 103 is not limited based on the size of the rail 4 as mentioned above, but some users may prefer the wheels 103 to be disposed within the rail 4.

With reference to FIGS. 5A, 5B, because the main support wheels 103 are disposed within the main part of the rail 4' a locking and tensioning mechanism may be disposed on a front or intermediate portion of the carriage 16' slightly above an upper surface of the rail 4' because it will not interfere with the wheels 103. The locking and tensioning mechanism includes a screw rod 21, a locking member 23 having a central threaded opening that is disposed on the screw rod 21 such that it moves along the screw rod 21 as the rod 21 is rotated, and a catch 25 fixed to the upper surface of the rail 4'. The locking member 23 has an engagement member 23' pivotably connected thereto which may pivot downward to operatively engage the catch 25 so that when the screw rod 21 is rotated the locking member 23 moves along the rod 21 and pushes the carriage 16 rearward as it does so. Reference number 21' is another engagement member which is engaged by the engagement member 23' when the member 23' is moved to the front end of the rod 21 and out of engagement with the catch 25. When engaged to member 21', the member 23' is moved closely adjacent to the main body of the locking member 23 where it will be less likely to be contacted or damaged by other parts of the system or cargo covered by the system as the carriage 16' rolls along the rail 4'. The member 23' may include a biasing means such as a spring (not shown) for normally urging the member away from the main body of the locking member 23.

With reference to FIG. 5C, the locking and tensioning mechanism shown therein is very similar to that of FIG. 5A except that the screw rod 21 is fixed to the rear end of the upper surface of the rail 4' rather than to a front end of the rolling carriage 16', while the catch 25 is fixed to a rear portion of the carriage 16' rather than to the rail 4'. Thus, operation of the mechanism in FIG. 5C is also very similar to that of the mechanism of FIGS. 5A, 5B.

Additional Load Securing Bracket

With reference to FIG. 6 there is shown an additional load securing bracket 38 which can be advantageously used with rolling type tarp cover systems according to an exemplary embodiment of the present invention. The bracket 38 may be formed of metal such as steel or aluminum, and may be fixed between the bump rail 3 typically provided at the lateral sides of flatbed trailers and the support rail 4 of the rolling type tarp system, and has an upper portion 38' shaped to securely engage a hook 39 such as may be provided on the end of a securing strap or the like. The bracket 38 may have a relatively narrow width at an intermediate portion thereof which is fixed between the bump rail 3 and the support rail 4, while the upper portion 38' of the bracket 38 to which the hook 39 would be secured may be significantly wider such that it extends over the bump rail 3. Such construction is advantageous because the bracket 38 does not significantly add to the width of the rolling type tarp system as disposed on the trailer 2, noting that government regulation strictly limit the overall width of the trailer and the tarp systems disposed thereon. The upper portion 38' of the bracket 38 is disposed entirely within the covered cargo space enclosed by the tarp cover system, so that the hook 39 of the cargo strap or the like may be conveniently connected thereto without affecting the tarp cover system in any way, but it is relatively small and compact so that it minimally reduces the amount of usable cargo space within the tarp cover system.

Locking and Tensioning Mechanism for Rear Bow

As discussed and described above, an adjustable locking and tensioning mechanism 100 for the rear bow 114 of the cover system as previously proposed by the applicant is shown in FIG. 7 and is generally triangular in shape and includes a hook 102 that engages an intermediate portion of the rearmost support bow 14 of the system 1 and moves the bow 114 rearward and slightly upward. Again, while the applicant's previously proposed locking and tensioning mechanism 100 is very effective for properly locking and tensioning the tarp cover, it has some limitations associated therewith. For example, the locking and tensioning mechanism 100 must be precisely positioned relative to the rear portion of the tarp cover system for properly tensioning same, both during initial installation of the locking and tensioning mechanism 100 on the trailer, and if the mechanism 100 must be removed and re-installed by a driver on location wherever the trailer may be disposed at any given time. This complicates the work required by persons installing and operating the system, and may lead to safety issues if done too hastily or improperly.

Figure 9:
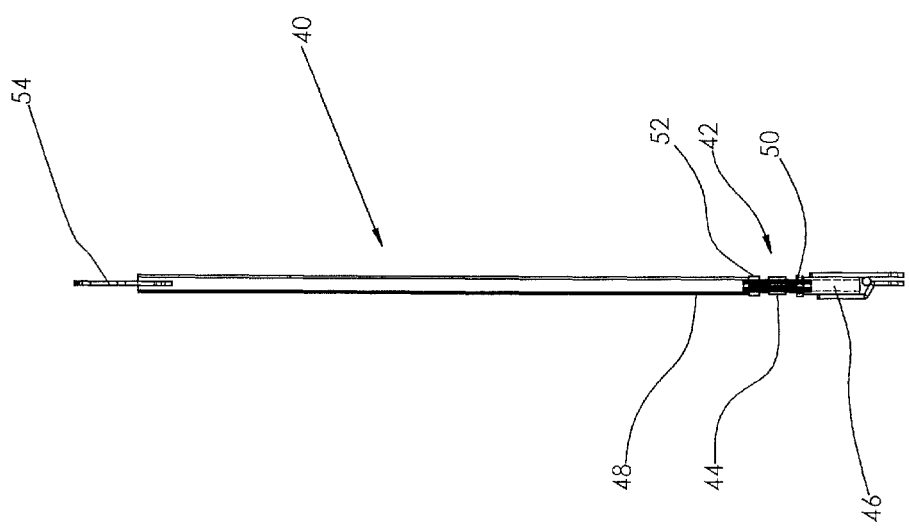
FIG. 9 is a side view of the vertically extending leg of FIG. 8.
Figure 8:
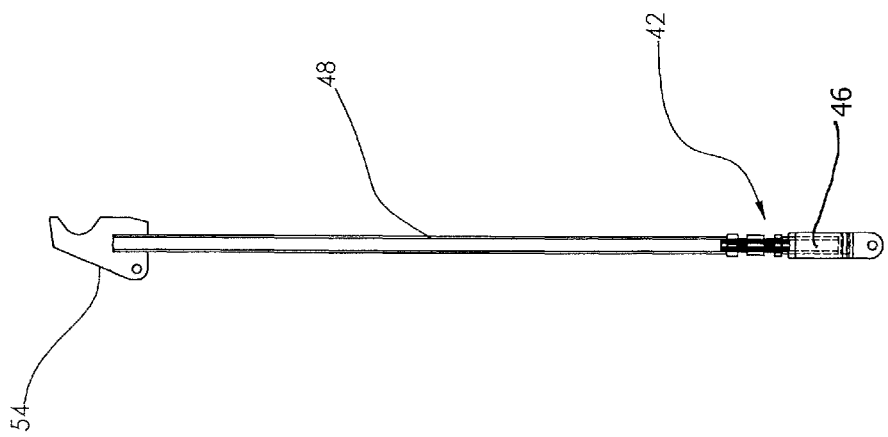
FIG. 8 is a front view of a modified, adjustable vertically extending leg which can be used in the previously proposed locking and tensioning mechanism of FIG. 7 according to an exemplary embodiment of the present invention.
Figure 10C:
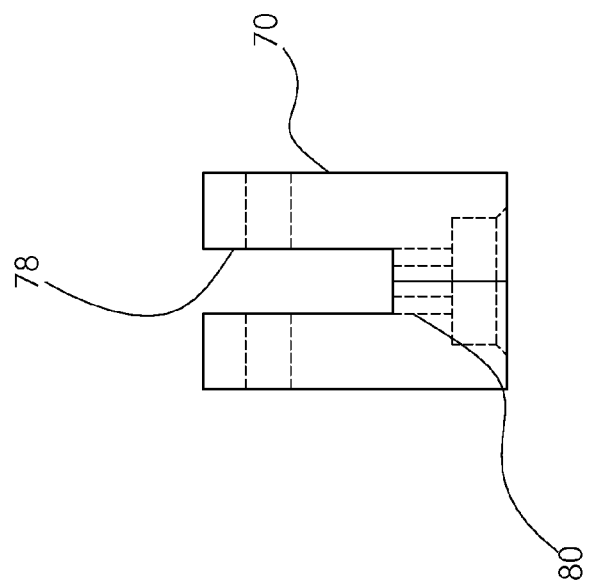
FIG. 10C is a side view of one component of the modification of FIG. 10A, with some details shown in broken lines.
Figure 10D:
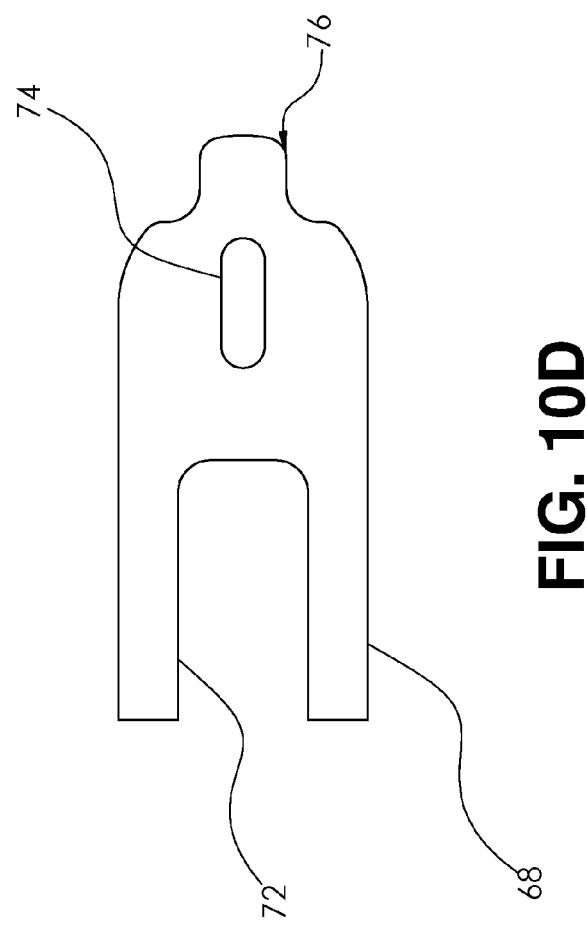
FIG. 10D is a side view of another component of the modification of FIG. 10A.

With reference to FIGS. 8-9, there is shown a first modification to applicant's previously proposed locking and tensioning mechanism shown in FIG. 7. This modification involves a vertically extending leg 40 of the adjustable, triangularly shaped mechanism 100, which corresponds to vertical leg 105 in FIG. 7. Specifically the leg 40 is made adjustable in length via an adjustment mechanism 42 at a lower portion of the leg 40. The adjustment mechanism 42 includes: a rod shaped adjustment member 44 which may be several inches long, with one end that is right hand threaded, an opposite end that is left hand threaded, and central portion which may be hex shaped or the like so that it may be engaged with a wrench or other tool for rotating the adjustment member 44; a lower adjuster receiver 46 having a threaded recess defined therein for receiving one of the threaded ends of the adjustment member 44; an upper adjuster receiver 48 having a threaded recess defined therein for receiving the other of the threaded ends of the adjustment member 44; a means for selectively preventing the length of the adjustment mechanism 42 from adjusting the length of the leg 40, such as a lower threaded jam nut 50 screwed onto the one threaded end of the adjustment member 44 before the adjustment member 44 is threaded into the threaded recess of the lower adjuster receiver 46; and an upper threaded jam nut 52 screwed onto the other threaded end of the adjustment member before the adjustment member 44 is threaded into the threaded recess of the upper adjuster receiver 48. The leg 40 has a hook 54 fixed to and projecting above the upper end thereof, which hook 54 corresponds to the hook 102 in FIG. 7 and has a curved recess on a rear edge thereof which will engage the engagement member projecting from an intermediate portion of the rear support bow 114, and an opening defined through a lower front portion thereof for having the upper end of the diagonal leg 106 of the triangular member pivotally connected thereto. The lower adjuster receiver 46 has an opening defined through a lower end thereof for being pivotally connected to a first bracket associated with the lower leg of the mechanism, such as the bracket 104 shown in FIG. 7.

Because the vertical leg 40 is provided with the length adjustment mechanism 42, permanent, appropriate locations for components of the locking and tensioning mechanism on the flatbed trailer 2 and on the rearmost supporting bow 114 of the cover system can be easily established when the mechanism is initially installed on the flatbed trailer 2 and the cover system 1 within a factory or the like, and removal and reattachment of the locking and tensioning mechanism throughout the life of the cover system is greatly facilitated.

For purposes of initial installation of the conventional locking and tensioning mechanism of FIG. 7 on the flatbed trailer 2, conventionally the positions on the trailer for the first and second securing brackets associated with the lower horizontal leg of the locking and tensioning mechanism, such as the first and second brackets 104, 104' provided with the lower horizontal leg 108 shown in FIG. 7, must be precisely determined in relation to the position of the engagement member (not shown) which is fixed to a vertically intermediate portion of the rearmost support bow 114 for being engaged by the hook 102 at the top of the vertical leg 105. The engagement member may include a cylindrical main body that projects inward of the cover system, with an outer diameter substantially corresponding to the curved recess diameter of the hook 102, and an enlarged inner end which prevents the hook from sliding off the main body. Because of such required precision positioning, the permanent positions of the first and second securing brackets 104, 104' on the trailer 2 would conventionally be established when the cover system was initially installed, e.g., at a factory, but the engagement member would be temporarily positioned on the rearmost bow during the initial installation, but not permanently positioned on the bow until after the trailer and cover system were delivered to a customer. This temporary and subsequent permanent positioning of the engagement member greatly complicates the installation process. Moreover, even after all the components were permanently installed on the trailer and bow, removal and reinstallation of the prior locking and tensioning mechanism during normal uses of the system may sometimes be made difficult by the fact that the tarp cover stretches somewhat over time, such that the components did not fit together in precisely the same way as when first installed.

With the modification of the locking and tensioning mechanism as shown in FIGS. 8-9, including the vertical arm 40 having the length adjusting mechanism 42, the discussed difficulties associated with the prior system of FIG. 7 are completely and easily resolved. The two securing brackets associated with the lower arm of the locking and tensioning mechanism can be installed at permanent, appropriate locations on a flatbed trailer 2 when the rolling tarp cover system is initially installed on the flatbed trailer, and the engagement member can also be permanently connected to the rearmost bow 114 during the initial installation, because the length adjusting mechanism 42 on the vertically extending arm 40 of the locking and tensioning mechanism permits sufficient adjustment capability to ensure that hook 54 at the upper end of the vertically extending arm 40 will properly engage with the engagement member on the rear bow 114 so that the tarp cover may be properly tensioned. Further, even if some components of the locking and tensioning mechanism must be subsequently removed from the trailer, e.g., for releasing tension to permit a portion of the cover system to be moved for exposing a portion of the trailer, such other components can be easily and safely removed and reinstalled with required precision relative to the rear bow by appropriately adjusting the length of the vertically extending leg using the length adjustment mechanism 42.

Still further, the applicant's existing commercial system may include a length adjusting mechanism (not shown) at the rear end of the tarp cover which extends the full height of the tarp cover, is approximately three-six inches wide in the longitudinal direction of the tarp cover, and can be adjusted to offset the increasing longitudinal length of the tarp cover over time as the tarp stretches, to thereby assure that the tarp cover can be properly/sufficiently tensioned. With the leg 40 and length adjustment mechanism 42 being provided with the tensioning mechanism according to the embodiment shown in FIGS. 8-9 it is possible to eliminate the length adjusting mechanism at the rear end of the tarp cover because the tensioning mechanism itself can be sufficiently adjusted via the mechanism 42 to offset the increasing longitudinal length of the tarp cover over time as the tarp stretches. This is a significant cost saving.

With reference to FIGS. 10A-10D there is shown a second modification of the applicant's previously proposed locking and tensioning mechanism of FIG. 7 according to an exemplary embodiment of the present invention. This modification pertains to the screw adjustment mechanism associated with the lower leg 108 and securing bracket 104 of the mechanism, and particularly to a cranking tool used with the same. As discussed in relation to FIG. 7, in the applicant's previously proposed locking and tensioning mechanism a crank handle or the like 107 is engaged to one end of the lower leg 108 and used to rotate the lower leg 108 so that the second bracket 104' moves along a threaded portion of the lower leg 108. In the previously proposed mechanism, the crank handle 107 must be engaged to the end of the lower leg 108 each time it is desired to do an adjustment, and then it is disengaged from the stored away until the next time it is used. This can be inconvenient, especially if the crank handle 107 becomes misplaced or lost. Hence, according to this modification, a modified crank handle 66 is provided which remains attached to the rear end of the lower leg 108, but is also foldable so that it can be moved between an operative rear position where it can be cranked by an operator and a front folded position disposed closely adjacent to the vertical leg 105 on one side thereof so that it does not take up much more space than the previously proposed locking and tensioning mechanism shown in FIG. 7, which is very important for maximizing usable cargo space within the cover system.

Particularly the crank handle 66 is movably connected to the end of the lower leg 108 via an attachment member 68 fixed to the rear end of the lower leg 108 and a coupling member 70 which is fixed on the end of the crank handle 66 and connected to the attachment member 68 such that it may be pivoted and axially moved relative thereto. As depicted, the attachment member 68 may be formed from a flat metal plate with a recess 72 formed in one end thereof and configured to be fixed to the rear end of the rotatable lower leg 108, an elongate opening 74 formed through a rear intermediate portion thereof, and a rear end 76 with a narrowed width. The coupling member 70 has central slot 78 with a width slightly greater than that of the attachment member 68 and extending about ½ to ⅔ the length of the coupling member 70 from one end thereof such that the coupling member 70 can be fitted onto the attachment member 68 via the slot 78, and has a central recess 80 extending further into the coupling member 70 from the base of the slot 78, which recess 80 is shaped to receive the narrowed rear end 76 of the attachment member 68 therein. Thus, when the attachment and coupling members 68, 70 are pivotally connected together via a pivot shaft, the pivot shaft can slide along the elongate opening 74 in the attachment member 68 to position the crank handle 66 either folded forwardly in its storage position as depicted in FIGS. 10A, 10B where it takes up little extra space, or rearwardly in its operative position where the handle 66 is extended in a position parallel to the horizontal leg 108 so that when the handle 66 is cranked it rotates the leg 108. For being placed in its operative position, the coupling member 70 is folded rearward and then pushed forward so that the narrowed rear end 76 of the attachment member 68 is disposed in the central recess 80 of the coupling member 70 to achieve a very stable, and rigid connection of the two components 68, 70 suitable for cranking of the horizontal leg 108. The permanently connected handle 66 according to this exemplary embodiment may, of course, be used together with the tensioning mechanism according to the exemplary embodiment shown in FIGS. 8-9, including the length adjusting mechanism 42

Support and Lifter Bows

Support Bows

Figure 14:
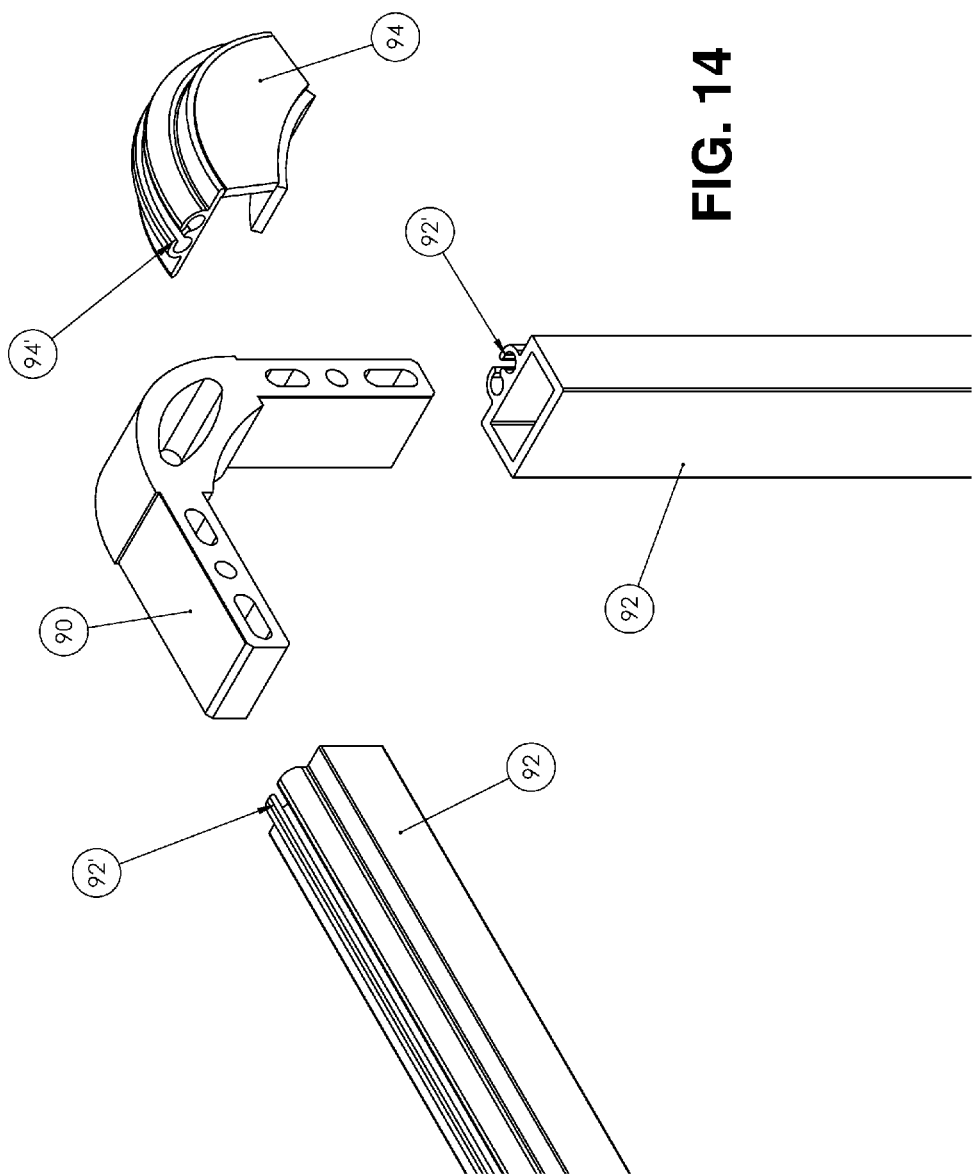
FIG. 14 is an exploded perspective view of parts of a support bow including a simplified corner piece according to an exemplary embodiment of the present invention.

Referring to FIG. 14 there is shown a new corner structure for a support bow 114 according to an exemplary embodiment of the present invention. The new corner structure primarily includes a corner piece 90 which may be formed of aluminum or other appropriate material with ends having a slightly reduced size such that they fit snugly within the open ends of the vertical and horizontal sections 92 of the support bow 114, and a cover 94 which connects over the middle part of the extruded corner piece 90 and may be formed of aluminum, plastic, or other appropriate materials. The corner piece 90 may be extruded from aluminum, for example. The cover 94 may be connected to the corner piece 90 by snap-fit engagement, via adhesive bonding, using fastener(s) or a combination of these.

The corner piece 90 may be securely connected in the open ends of the sections 92 of the support bow exclusively by friction engagement of the ends of the corner piece 90 in the open ends of the support bow sections 92. Of course, it is also possible to further enhance the connection strength using bonding adhesive such as an epoxy resin, fasteners (not shown) that extend into or through ends of the support bow sections 92 and the corner piece 90, etc. Also various openings may be defined through the corner piece 90 as shown, which desirably reduce the mass and weight of the corner piece 90, but still permit the corner piece 90 to have sufficient strength and rigidity to securely connect the sections 92 of the support bow 114, while permitting the support bow 114 to reliably support the tarp cover of the system over the life of the system. If fastener(s) that extend into or through ends of the support bow sections 92 and the corner piece 90 are used for providing additional strength and rigidity, the openings in the corner piece 90 may be conveniently used for passage of portions of the fastener(s) therethrough.

As shown, each of the sections 92 of the support bow may have a connector 92' integrally provided on an outer surface thereof including two substantially circular recesses, an inward projection that separates the substantially circular recesses, and an outer slot, and the cover 94 has a similar connector 94'. The connectors 92', 94' may be used for securing the ends of two adjacent tarp sections to the support bow as discussed in U.S. Pat. No. 8,047,600 relative to FIG. 13C thereof. The sections 92 of the support bow 114 may be directly extruded including the connector 92', but the corner piece 90 has a more complex shape such that it would be very difficult to form such a connector directly on the corner piece 90, so that providing the cover 94 including the connector 94' is simpler.

Figure 15:
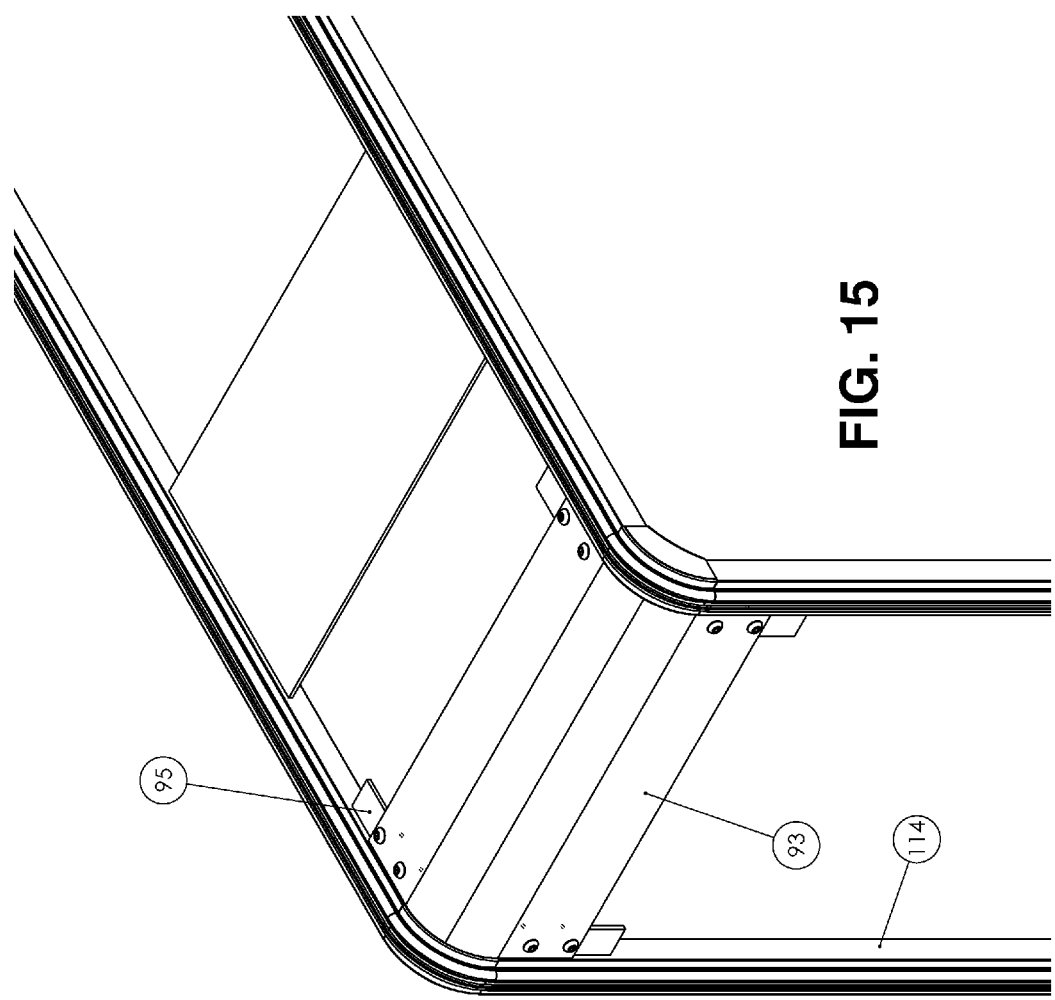
FIG. 15 is a perspective view of an upper corner portion of connected, adjacent support bows including the extruded corner piece of FIG. 14.

Additionally, some of the support bows 114 of the cover system may have an increased width and size for additional strength, e.g., each of these support bows 114 may include two of the smaller support bows 114 connected together and supported by larger sized rolling carriages 16 such as the front most and rear most support bows 114 as shown in FIG. 1A. For these wider support bows 114, an additional cross piece 93 may be provided which is connected to the support bows 114 using brackets 95 and fasteners such as rivets as shown in FIG. 15. The cross piece 93 may be formed of several flat or substantially flat metal sections disposed continuously adjacent to each other in a 90° curved shape so that it does not protrude into the cargo storage space within the tarp cover system to any appreciable extent, and similarly the brackets 95 may be a metal plate bent 90° in the middle so that they do not protrude into the cargo storage space to any appreciable extent.

Figure 12:
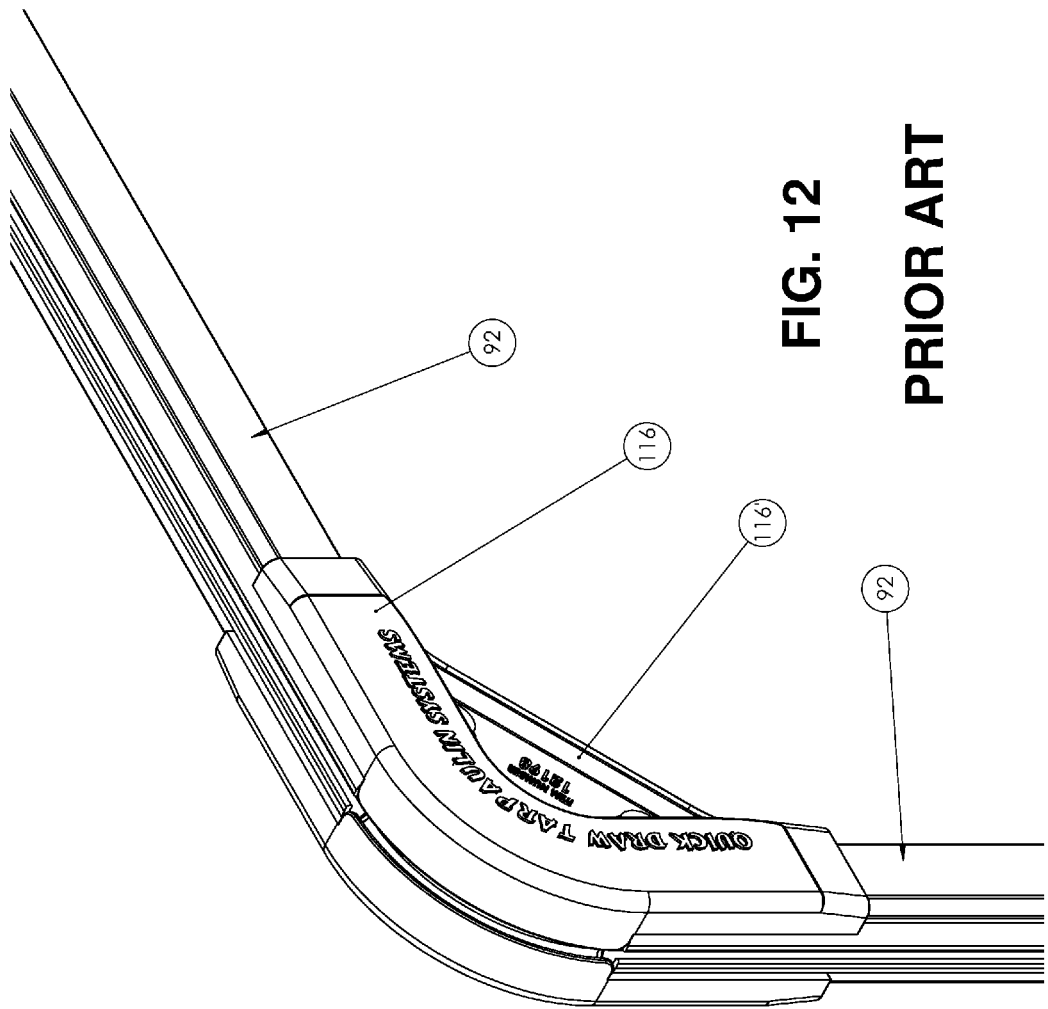
FIG. 12 is a perspective view of a corner section of a tarp support bow according to a system previously proposed by the applicant.

By comparison of the corner structure including corner piece 90 to the applicant's prior corner 116 as shown in FIG. 12, it will be understood that the corner structure including corner piece 90 can significantly reduce the cost of the support bow 114. The size, weight and cost of the corner piece 90 are much less than those of the prior corner structure shown in FIG. 12 involving pairs of die cast aluminum members 116 that surround the ends of the support bow sections 92. Additionally, much less effort is required to install the corner pieces 90 into the open ends of the sections 92 of the support bow 114 as compared to fitting the die cast aluminum members 116 over the ends of the sections 92 and fastening them together. Also, the weight reduction achieved using the extruded corner pieces 90 reduces the weight of the entire cover system 1 and this will later result in reduced fuel consumption for the vehicle on which the cover system is installed over the life of the cover system. Still further, the prior corners members 116 included triangular shaped webs 116' extending between the ends of the bow sections 92, which undesirably also extended into and thereby reduce the cargo space within the tarp cover, whereas the extruded corner piece 90 does not include any such web. The cross piece 93 and brackets 95 shown in FIG. 15 also do not extend or project into the cargo space within the tarp cover.

Lifter Bows

Figure 11:
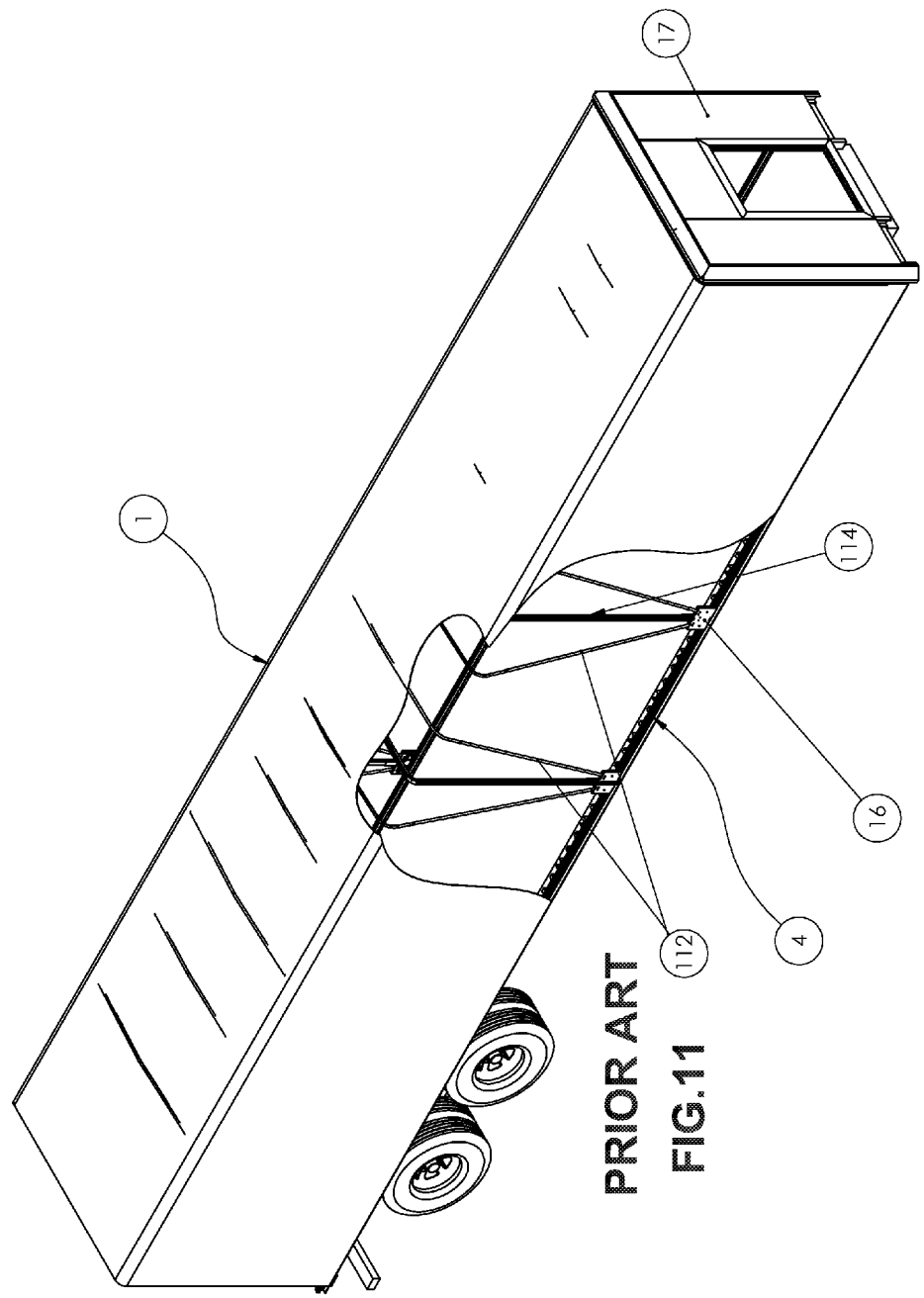
FIG. 11 is a perspective view of a flatbed trailer having a conventional rolling tarp cover system provided thereon, with a portion of the tarp cover omitted to better understand the tarp supporting structure of the system.

As discussed above with reference to FIGS. 11, 13, in the applicant's existing commercial tarp cover system sold under the trademark QUICK DRAW™ includes lifter bows 112 formed of straight sections of aluminum tubing 93 with plastic corner members 118 that connect ends of the vertical and horizontal sections of aluminum tubing 93 for a given lifter bow 112, and also pivotally connect two adjacent lifter bows 112 for permitting them to rotate toward and away from each other as the tarp cover system is expanded and collapsed.

Figure 17:
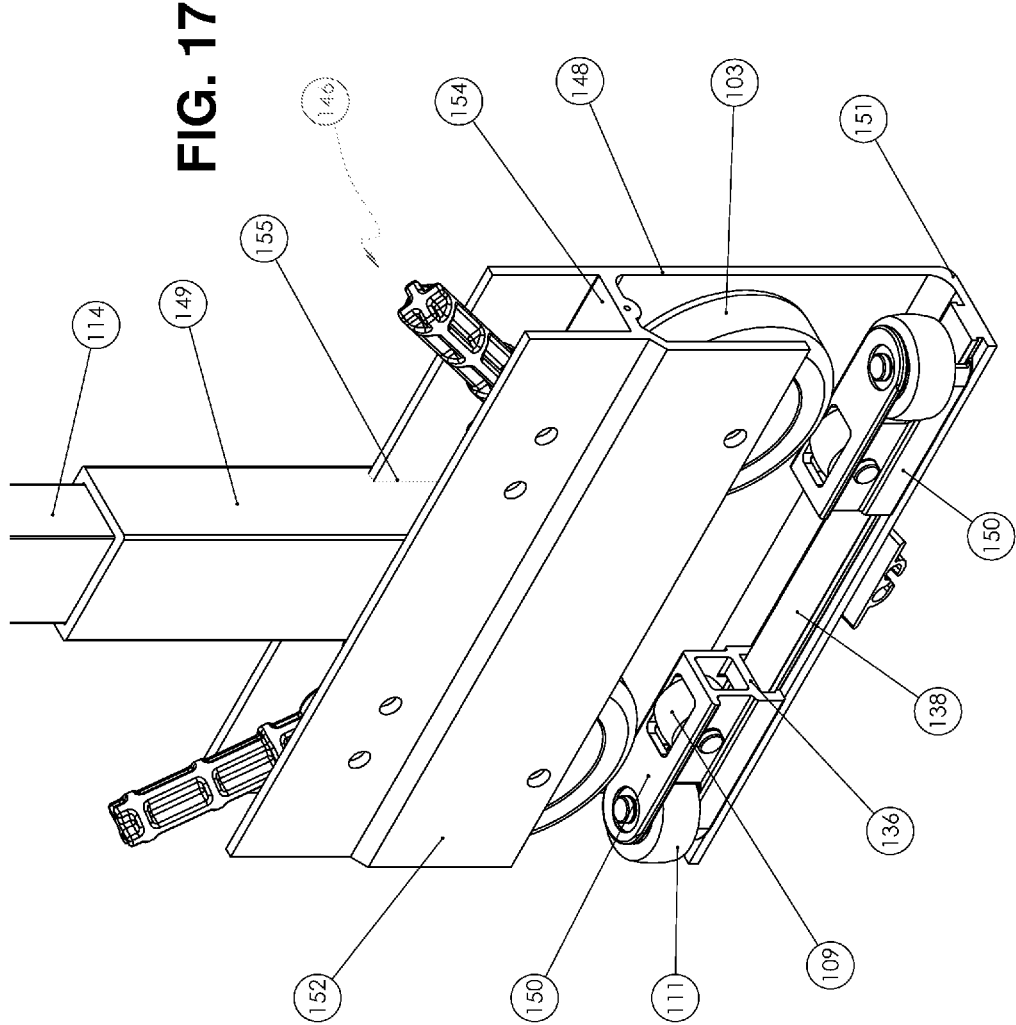
FIG. 17 is a perspective view of an embodiment of a rolling carriage formed primarily of aluminum according to an exemplary embodiment of the present invention.

As a less expensive alternative to the existing arrangement, and according to an exemplary embodiment of the present invention, the plastic corner members 118 are eliminated, and each of the lifter bows 112 may be simply formed from two straight vertical sections of aluminum tubing 93 and a horizontal top section of aluminum tubing 93 with end sections bent 90° downward and swaged ends which frictionally fitted to upper ends of the vertical sections. The lower ends of the vertical sections are connected to the pivoting connectors provided with the wheeled carriages 16 on opposite sides of the system so that the lifter bows 112 may pivot relative to the wheeled carriages 16 the same as in the prior arrangement. Examples of such pivoting connectors provided with the wheeled carriages 16 are shown in FIG. 17. In order to assure that the simplified lifter bows 112 provide sufficient lift for the tarp cover between the support bows 114, the horizontal sections of lifter bows 112 associated with adjacent support bows 114 may be joined together and to the upper, horizontally extending portion of the tarp cover 101 using fasteners such as hook-and-loop fasteners 97 sewn or otherwise bonded to the tarp cover 101 centrally between adjacent support bows 114 and which may be securely wrapped around the horizontal sections 93 of the lifter bows 112. Of course, other appropriate securing means could be used for such purpose.

Figure 16:
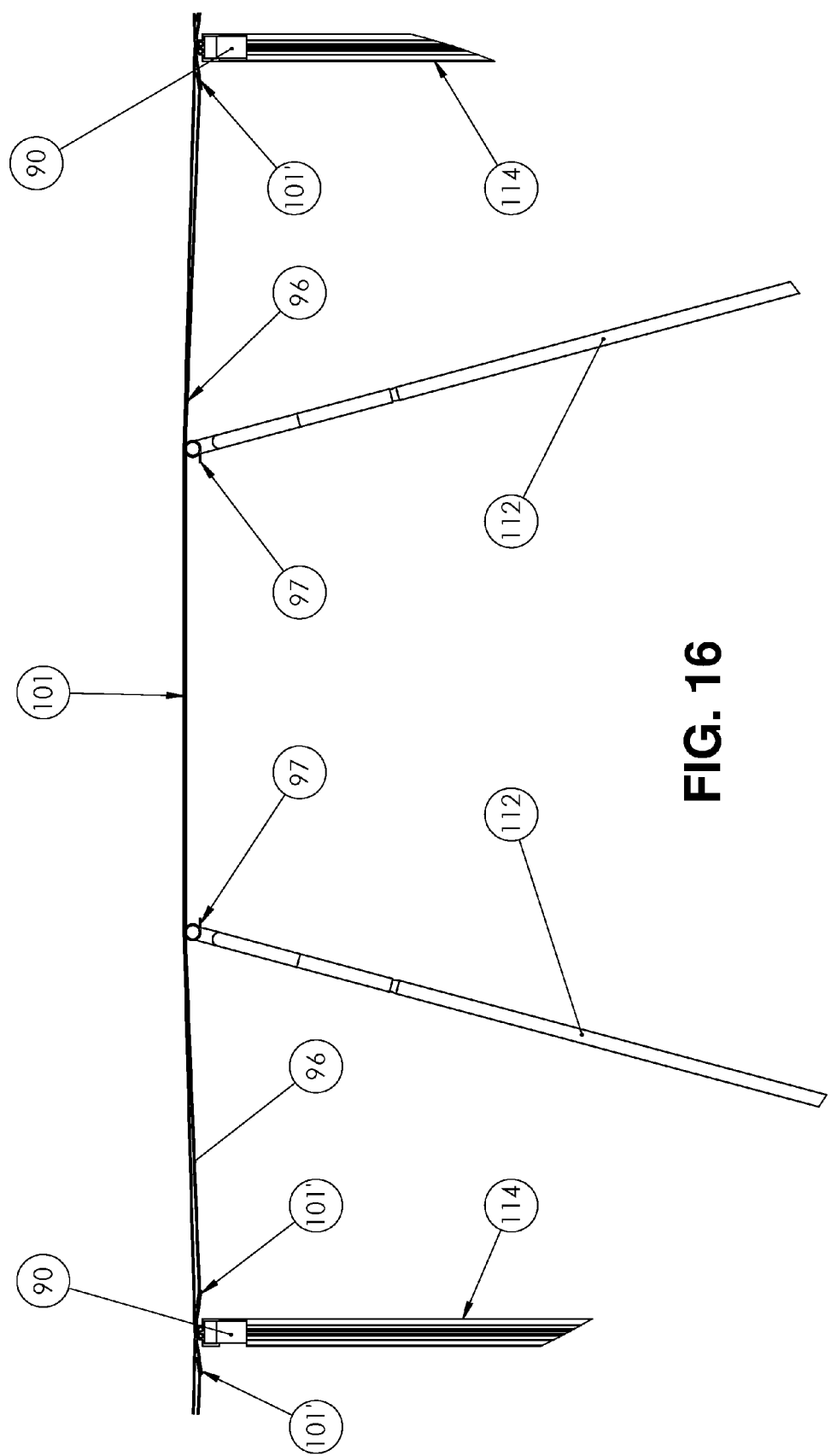
FIG. 16 is a side view from inside a cover system including additional support strips provided with the tarp cover according to an exemplary embodiment of the present invention.

Further, according to a novel aspect of the present invention and as shown in FIG. 16 additional support strip(s) 96 of the vinyl used for the tarp cover 101 or another appropriate material are connected to the inner surface of the upper, horizontal portion of the tarp cover 101 such that they extend longitudinally of the cover system, e.g., two or three of the strips may be provided which extend parallel to each other and spaced from each other in the width direction of the cover system 1. The support strip(s) 96 may be connected to the inner surface of the upper, horizontal portion of the tarp cover 101 by being sewn and/or adhesively bonded thereto, or by any other appropriate means. Additionally, as shown in FIG. 16 each of the strips 96 may be provided in sections, e.g., corresponding to the number of sections of the tarp cover 101. For example, in the applicant's existing commercial system the tarp cover 101 is formed in sections with the ends/edges 101' of two adjacent sections being connected to one of the support bows 114 via the connectors 92', 94' as discussed above. With the existing structure the ends/edges 101' of the sections of the tarp cover are extend loosely inwardly of the tarp cover 101 a few inches after passing through the connectors 92', 94', and the strips 96 may be conveniently sewn or otherwise connected between the loose ends 101' of the tarp sections as shown in FIG. 16. The support strips 96 help to support the top sections of the tarp cover 101 between the support bows 114 in a substantially horizontal state when the cover system 1 is in its fully expanded state.

Figure 13:
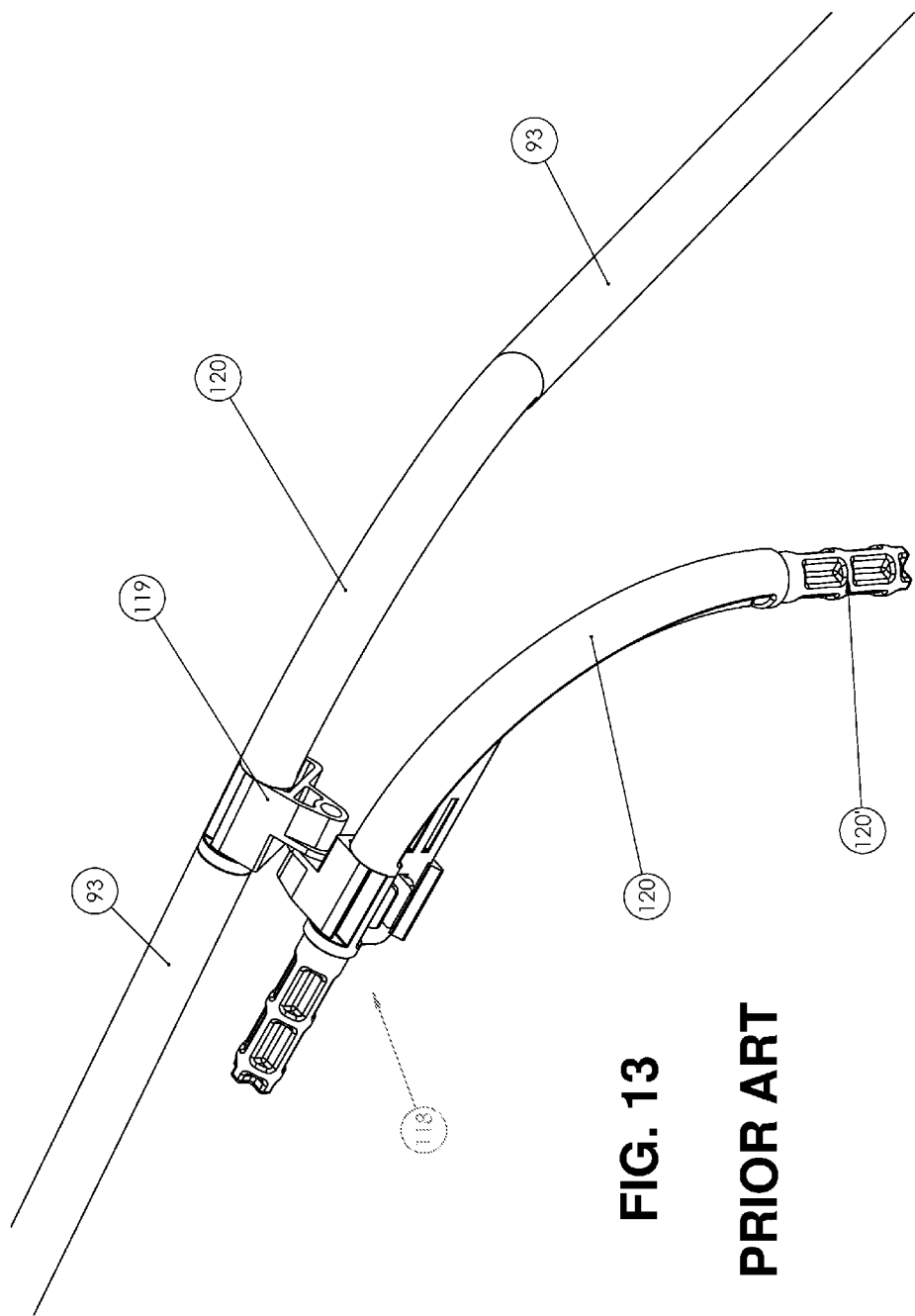
FIG. 13 is a perspective view of a corner section of a tarp lifter bow according to the applicant's previously proposed system.

By comparison of the new exemplary embodiment, including the aluminum tubing sections 93 fitted together in a U-shape and the additional strip(s) 96 as shown in FIG. 16, to the applicant's prior arrangement including the plastic corner members 118 as shown in FIG. 13, it will be understood that the new exemplary embodiment including the aluminum tubing sections 93 and strip(s) 96 can significantly reduce the cost of the lifter bow 112 in terms of size, weight, and complexity. The prior corner members 118, which are somewhat involved, are completely eliminated, and although the sections of the lifter bows 112 need to be fitted together in a U-shape and the strip(s) 96 are added in the new embodiment, the overall cost, complexity, and weight of the lifter bows 112 is significantly reduced.

Improvements to the Wheeled Carriages and Support Rails

Again, the applicant's commercial version of its rolling tarp cover system sold under the trademark Quick Draw™ has rolling carriages primarily formed of steel such as shown in FIGS. 6-8 of U.S. Pat. No. 5,924,759 and at 16 in present FIGS. 3 and 6. The prior rolling carriages 16 have a main body formed of steel plates bent into appropriate shapes and welded and/or bolted together, primary support wheels 103 rotatably secured to vertically intermediate portions of the main body and which roll along the top of the rail 4, as well as smaller guide wheels 111 that rotate about vertically extending axes and one or two smaller keeper wheels 109 which rotate about horizontally extending axes. The smaller wheels 109, 111 are rotatably secured to a lower portion of the main body, are disposed within the within the rail 4, and provide stability in maintaining the carriages 16 properly aligned on the rail 4, details of which are explained in U.S. Pat. No. 5,924,759. While the prior rolling carriage 16 formed primarily of steel is very durable and reliable, it is also relatively heavy, particularly when it is considered that the overall system includes a large number of the carriages 16, e.g., 12-20, and also requires a relatively large amount of labor for assembly and maintenance, e.g., if one of the guide or keeper wheels 109, 111 requires maintenance or replacement it is typically necessary to remove the corresponding carriage 16 from the system in order to access the wheel 109 or 111. Hence, applicant has investigated manners of reducing the weight and complexity of the rolling carriages 16 and has determined that it is possible to form a rolling carriage 16 primarily of a lighter, rigid material such as aluminum or an aluminum alloy, and with a simple modular arrangement in essentially the same size as the prior main body made of steel, while still assuring proper operability and durability of the rolling carriage 16.

Modular Aluminum Carriage Construction

Figure 18:
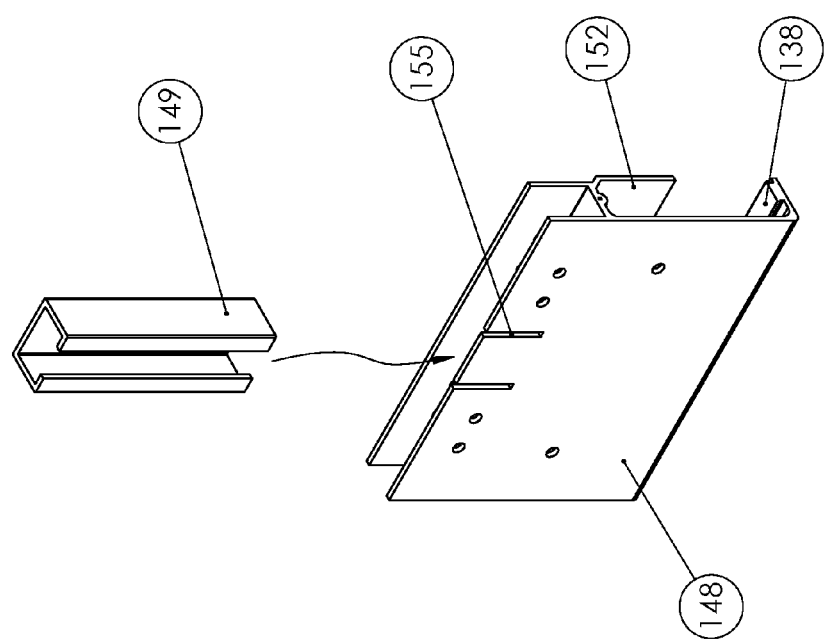
FIG. 18 is an exploded perspective view of two components of the exemplary embodiment of FIG. 17.

With reference to FIGS. 17, 18 there is shown an exemplary embodiment of a rolling carriage 146 formed primarily of aluminum according to an exemplary embodiment of the present invention. Particularly, the rolling carriage 146 includes three primary components or modules which may each be formed of aluminum or an aluminum alloy, e.g., through an extrusion process, and readily joined together, i.e., a main body having the main support wheels 103 rotatably connected thereto, an upper receiver 149 that receives a lower end of a support bow 114 therein, and a pair of wheel housings 150 which support the guide and keeper wheels 109, 111 of the carriage 146.

As depicted, the main body may include an outer vertical wall 148 with a horizontal wall 151 extending inward at a lower end thereof, as well as an inner wall 152 which is substantially vertical and is connected to the outer vertical wall 148 at a vertically intermediate position via an upper horizontal wall 154 that is positioned slightly above the primary support wheels 103 of the carriage. The upper receiver 149 may be a substantially tubular member of rectangular cross section which is fitted and welded to slots 155 defined in an upper portion of the wall 148 of the main body for stably connecting the upper receiver 149 to the main body.

Each of the wheel housings 150 may be generally shaped as a rectangular box having a channel 136 defined in a lower portion thereof which may be fitted onto a guide track 138 provided on an upper surface of the bottom horizontal wall 151 of the main body so that the housings 150 may slide along the track 138. Each housing 150 rotatably support a guide wheel 111 and a keeper wheel 109, e.g., using steel shafts or pins that extend through central openings of the wheels 109, 111 with ends that are fixed to the housing 150. For installing the wheel housings 150 on the rolling carriage 146 the housings 150 may be disposed at appropriate positions along the guide track 138 and secured to the track using appropriate fasteners such as screws (not shown). Should either of the wheels 109, 111 on a housing 150 require maintenance or replacement, the housing 150 may be easily removed and replaced by releasing the fastener, removing the old housing 150 by sliding it off the guide track 138, sliding a new housing 150 onto the track 138 and again applying the fastener. Significantly, such removal and replacement of a housing may be readily accomplished without having to separate the rolling carriage 146 from the rail 4, which is very advantageous.

The modular, aluminum construction of the carriage 146 is very advantageous because it greatly reduces the weight of the carriage 146, as well as the time and effort required for assembly and maintenance of the rolling carriage 146, in comparison to the conventional carriage 16 formed primarily of steel. With such construction the rolling carriage 146 has sufficient strength and durability to properly support the cover system 1 over a useful life similar to that of the conventional steel rolling carriage 16, but the carriage 146 weighs considerably less than the prior rolling carriage 16, e.g., from 20-50% less.

Rolling Carriage with Top and Inner Riding Wheels and Rail Therefor

Referring to FIGS. 19, 20 there is shown a rail 140 and an outer vertical wall 142 of a rolling carriage 146 having top rolling wheels 143 and inner rolling wheels 144 according to an exemplary embodiment of the present invention. Some components of the rail 140 and the carriage 146 are omitted for ease of understanding, but it will be understood that the rail 140 and rolling carriage 146 will also include these other components similarly to the existing carriage 16 shown in FIGS. 3 and 6, e.g., a seal in the lower part of the rail 140 which engages the lower edge of the tarp as secured by a tarp clip at the bottom of the carriage 146, etc. The rail 140 is distinct from the conventional rail 4, such as shown in FIGS. 3 and 6, in that it has an increased vertical height, includes an intermediate horizontal wall 141, and has a channel for securing the seal (not shown) below the intermediate horizontal wall 141. The rolling carriage 146 is distinct from the conventional rolling carriage 16, such as shown in FIGS. 3 and 6, in that the outer vertical wall 142 has an increased vertical height, it rotatably supports the wheels 143 for rolling along an upper surface of the rail 140 as well as the wheels 144 for rolling along an upper surface of the intermediate horizontal wall 141, and a horizontal wall 145 that supports guide wheels 109 such that the guide wheels 111 engage lateral walls of the upper portion of the rail 140 for stability is provided at a lower intermediate portion of the vertical wall 142 rather than at a bottom thereof. Further, the pair of wheels 144 that roll along the intermediate horizontal wall 141 of the rail 140 may also engage the lower surface of the upper horizontal wall of the rail 140, and thereby function to stabilize the rolling carriage 146 on the rail 140 similarly to the keeper wheels 109 of the prior system, in which case the conventional keeper wheels 109 may be eliminated.

The embodiment as shown in FIGS. 19, 20 is advantageous in comparison to the prior system as shown in FIGS. 3 and 6 in that it can reliably support larger and heavier tarp systems, even if such systems are exposed to particularly significant external forces during use, e.g., if a vehicle on which the system is mounted is traveling off road.

Additionally, it will be understood that modifications may be made to the embodiment shown in FIGS. 19-20. For example, the wheels 144 are disposed directly below the wheels 143, but they need not be. Also, it is possible to use a different numbers of the wheels 143, 144, e.g., only one wheel 144 could be used together with two of the wheels 143 on a rolling carriage 146.

Rolling Carriage Position Lock

A primary advantage of rolling tarp cover systems such as those according to the present invention is that the tarp cover can be easily moved into essentially any desired position, e.g., for a trailer-mounted system it can be moved from front-to-back and/or back-to-front for selectively exposing any desired portion of the flatbed which is normally covered by the system when it is fully extended, whereby a desired portion of the cargo load may be conveniently placed on or removed from the desired portion of the trailer by a forklift or other device without any concern for other cargo supported on other parts of the trailer.

Figure 21:
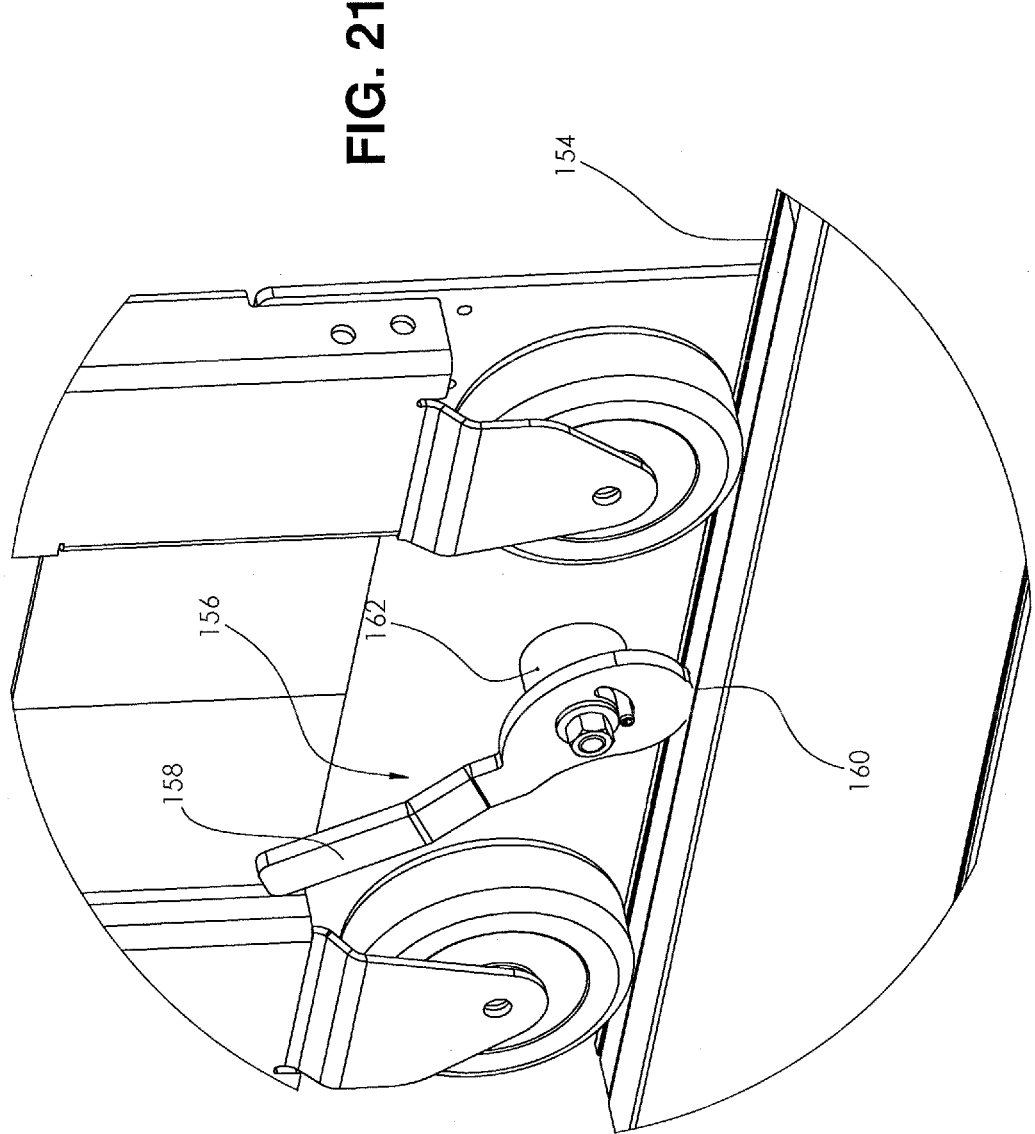
FIG. 21 is a perspective view of a locking mechanism used in conjunction with a rolling carriage according to an exemplary embodiment of the present invention.

Generally, the rolling cover system will stay in a given position to which it has been moved because it is relatively heavy and because the system extends over the flat bed and to both sides of trailer on which it is disposed such that one side of the cover system is hindered or prevented from moving by its connection to the other side of the system. That being said, it is nonetheless desirable to assure that the cover system remains in a given position while cargo is being loaded onto or off of the trailer so as not to interfere with the loading or unloading process and to prevent damage to the system. To satisfy such desire, applicant has created a locking mechanism for the rearmost and front most and/or other rolling carriages 16 of the cover system 1, an exemplary embodiment of which is shown at 156 in FIG. 21.

The locking mechanism 156 includes a handle 158 which may have one end rotatably connected to an inside surface of the outer vertical wall of the carriage 16 at a level generally corresponding to that of the main wheels 103 which roll along the upper surface of the rail 4. The rotatably connected end is formed with an enlarged size and has a cam 160 defined in an outer circumferential surface thereof so that the free end of the handle 158 may be simply rotated for selectively engaging and disengaging the cam surface 160 to/from the rail 4, to thereby lock and unlock the carriage 16 relative to the rail 4. The handle may be disposed intermediate the two main wheels 103 and a spacer 162 may be provided between the handle 158 and the outer vertical wall of the carriage 16 which moves the handle away from the outer vertical wall of the carriage 16 so that the wheels 103 and the outer wall will not interfere with movement of the handle 158. The cam surface 160 may engage a replaceable wear strip 154 formed of nylon or other plastic provided on a portion of the upper surface of the rail 4, which is also what the wheels 103 roll along. This is desirable because the wear strip 154 is easily replaced when it becomes worn or damaged. With the locking mechanism 156 according to the exemplary embodiment a rolling carriage 16 may be simply and precisely positioned anywhere along the rail 4.

Pneumatic Assist Front Locking Mechanism

In applicant's existing rolling tarp cover system 1 the front headboard 17 may be locked to front most support bow 114. Typically, this is accomplished using a manually actuated locking mechanism which includes vertically extending latch plates fixed to the front most support bow 114 with recesses extending down into the latching plates, vertically movable latching bars provided on laterally opposite sides of the headboard 17 with latches that recesses of the latching plates, and manually actuated levers which move the latching bars up and down for unlatching and latching the latching bars to the recesses in the latching plates. The manually actuated levers extend outward of the headboard 17 so that an operator may access same from outside of the cover system, and may rest flat against the headboard 17 when the front most support bow is latched to the headboard 17.

While the manually actuated arrangement is effective and reliable, applicant has enhanced the existing locking mechanism with a pneumatic assist, an exemplary embodiment of which is shown in FIGS. 22, 23 at 170. FIG. 22 is a front perspective view from outside of the headboard 17 of one lateral side of the headboard 17 where the locking mechanism locks the one lateral side of the headboard 17 to one side of the front most support bow 114, and FIG. 23 is a rear perspective view from inside of the system showing the one side of the front most bow 114 latched to one side of the headboard 17. It will be understood that the opposite side of the headboard 17 is locked to the opposite side of the front most support bow 114 symmetrically to the one side. The locking mechanism 170 includes a pair of latch plates 172 connected to upper and lower portions of the support bow 114, respectively, a vertically extending latch bar 174 connected to the headboard 17 such that it may be moved up and down for engaging latches on the latch bar 174 with recesses in the latching plates 172 similarly to the prior system, as well as a pneumatic cylinder 176 operatively associated with the latch bar 174 and a switch or other control mechanism (not shown) which an operator would manipulate for actuating the pneumatic cylinder 176 for selectively moving the bar 174 up and down to unlatch it from and latch it to the latching plates 172. The system may also include a manually operated lever 43 for moving the latch bar up and down similarly to the conventional system, so that the locking mechanism may be manually operated even if the pneumatic cylinder 176 malfunctions.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention. Also two or more of the exemplary embodiments of the present invention, or aspects thereof, may be used together in a movable tarpaulin system such as the truck trailer mounted system shown in FIG. 11. Of course, the exemplary embodiments may be used separately from each other or only portions of an embodiment may be used with another embodiment.

We claim:

1. A movable, trailer-mounted tarp enclosure system including a support rail, a tarp cover, a plurality of substantially U-shaped bows connected to and supporting the tarp cover, and rolling carriages connected to lower ends of said bows and which roll along the support rail, wherein the support rail comprises:

a first elongate rail section which is fixed to the trailer and extends substantially parallel to a cargo support surface of the trailer;

a second elongate rail section which is movably connected to the trailer; and a support mechanism which connects the second elongate rail section to the trailer such that the second elongate rail section may be moved between a first position extending continuously to the first elongate rail section along a common axis and a second position parallel to but at a different level from the first elongate rail section, wherein the support mechanism includes a plurality of pivoting links connected in parallel between the trailer and the second elongate rail section.

2. A movable, trailer-mounted tarp enclosure system including a support rail, a tarp cover, a plurality of substantially U-shaped bows connected to and supporting the tarp cover, and rolling carriages connected to lower ends of said bows and which roll along the support rail, wherein the support rail comprises:

a first elongate rail section which is fixed to the trailer and extends substantially parallel to a cargo support surface of the trailer;

a second elongate rail section which is movably connected to the trailer;

a support mechanism which connects the second elongate rail section to the trailer such that the second elongate rail section may be moved between a first position extending continuously to the first elongate rail section along a common axis and a second position parallel to but at a different level from the first elongate rail section; and a locking mechanism which locks the second elongate rail section in the first and second positions.

3. The movable, trailer-mounted tarp enclosure system according to claim 2, wherein the locking mechanism is connected to the second elongate rail section, moves between different positions thereof when the second elongate rail section is moved between its first and second positions.

4. The movable, trailer-mounted tarp enclosure system according to claim 2, wherein the locking mechanism includes different portions which lock the second elongate rail section in the first and second positions thereof.

5. A movable, trailer-mounted tarp enclosure system including a support rail, a tarp cover, a plurality of substantially U-shaped bows connected to and supporting the tarp cover, and rolling carriages connected to lower ends of said bows and which roll along the support rail, wherein the support rail comprises:

a first elongate rail section which is fixed to the trailer and extends substantially parallel to a cargo support surface of the trailer;

a second elongate rail section which is movably connected to the trailer; and a support mechanism which connects the second elongate rail section to the trailer such that the second elongate rail section may be moved between a first position extending continuously to the first elongate rail section along a common axis and a second position parallel to but at a different level from the first elongate rail section, wherein the second elongate rail section includes a support surface which is engaged by wheels of the rolling carriages for rolling movement therealong and which faces upward in both the first and second positions of the second elongate rail section.

6. The movable, trailer-mounted tarp enclosure system according to claim 5, further comprising a headboard fixed at a front end of the trailer, and the support rail further includes a short rail section which is fixed to the headboard in parallel to the first elongate rail section, and extends continuously to the second elongate rail section along a common axis when the second elongate rail section is in the second position thereof.

7. The movable, trailer-mounted tarp enclosure system according to claim 5, wherein one of the substantially U-shaped bows have a shorter vertical height than others of the substantially U-shaped bows, the at least one shorter bow is configured to roll along the second elongate rail section in the second position thereof, and the longer bows are configured to roll along the second elongate rail section in the first position thereof.

8. The movable, trailer-mounted tarp enclosure system according to claim 7, wherein one of the longer bows includes a projection which engages and supports the at least one shorter bow when the at least one shorter bow is not operatively engaged to the second elongate rail section.

* * * * *